(12) United States Patent
Yamashita

(10) Patent No.: US 8,947,798 B2
(45) Date of Patent: Feb. 3, 2015

(54) LENS CAP UNIT

(71) Applicant: Naoyuki Yamashita, Yokohama (JP)

(72) Inventor: Naoyuki Yamashita, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 13/713,574

(22) Filed: Dec. 13, 2012

(65) Prior Publication Data
US 2013/0148217 A1 Jun. 13, 2013

(30) Foreign Application Priority Data

Dec. 13, 2011 (JP) ................................. 2011-272245

(51) Int. Cl.
G02B 7/02 (2006.01)
G02B 27/00 (2006.01)
G03B 11/04 (2006.01)

(52) U.S. Cl.
CPC .............. *G02B 7/02* (2013.01); *G02B 27/0006* (2013.01); *G03B 11/043* (2013.01); *G03B 11/045* (2013.01)

USPC .......................................................... 359/827

(58) Field of Classification Search
USPC .......................................................... 359/827
See application file for complete search history.

(56) References Cited

U.S. PATENT DOCUMENTS

2007/0193901 A1* 8/2007 Cohen ......................... 206/316.2

FOREIGN PATENT DOCUMENTS

JP 2009-258600 11/2009

* cited by examiner

*Primary Examiner* — James Jones
(74) *Attorney, Agent, or Firm* — Oblon, Spivak, McClelland, Maier & Neustadt, L.L.P.

(57) ABSTRACT

A lens cap unit includes a mounting part mounted on a fixed cylinder in which a movable lens cylinder is movably contained, at least one barrier provided on the mounting part to be movable between a closed position covering a leading end portion of the movable lens cylinder and an opened position opening the leading end portion of the movable lens cylinder, and a cam protrusion provided on the barrier. The cam protrusion engages with the movable lens cylinder at a position outside an effective diameter of the movable lens cylinder.

19 Claims, 17 Drawing Sheets

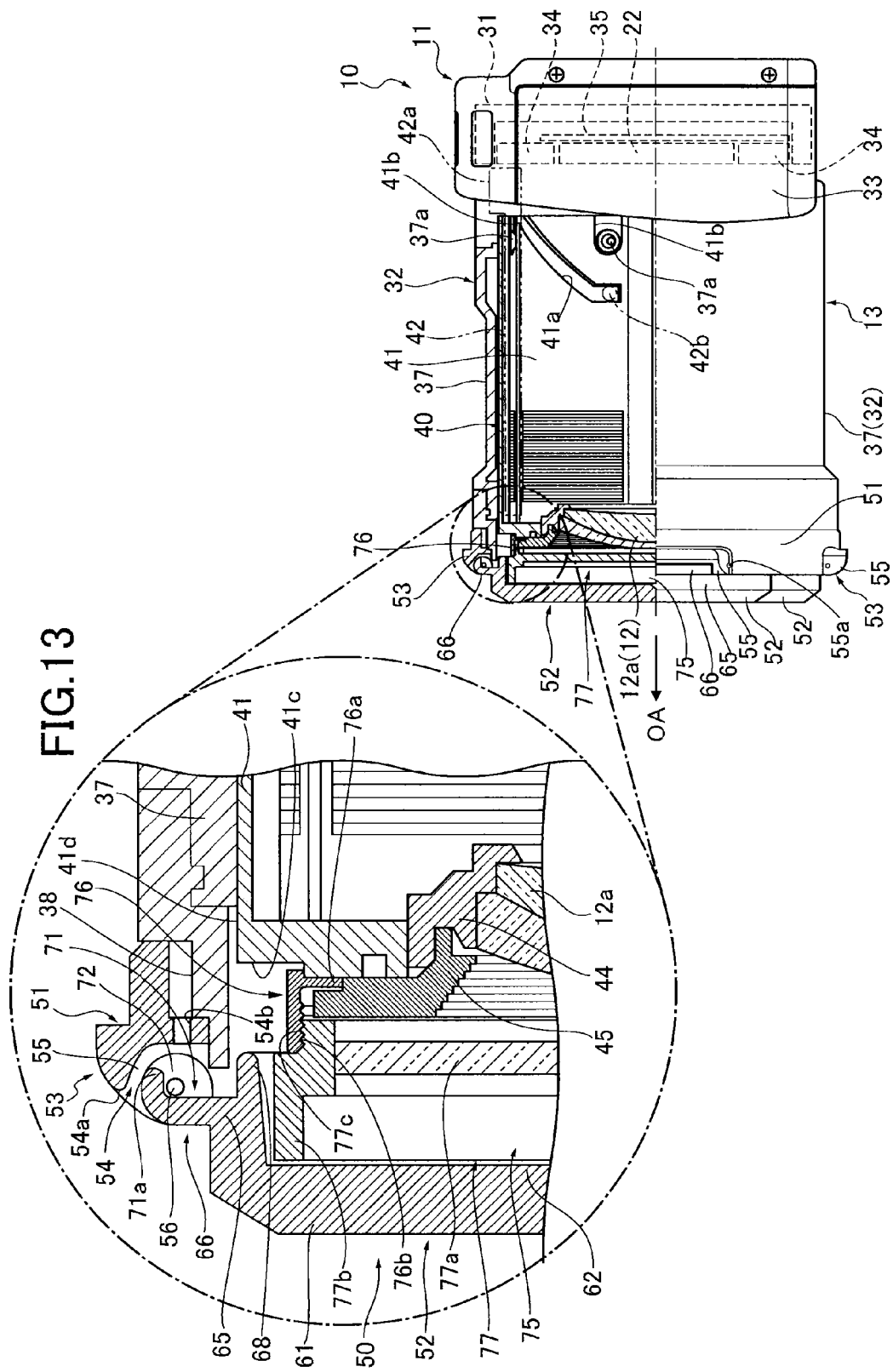

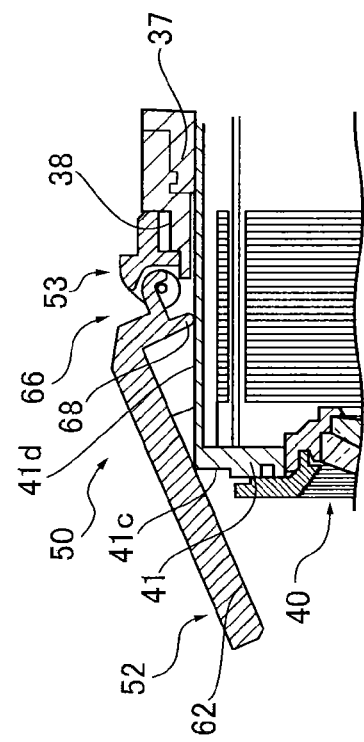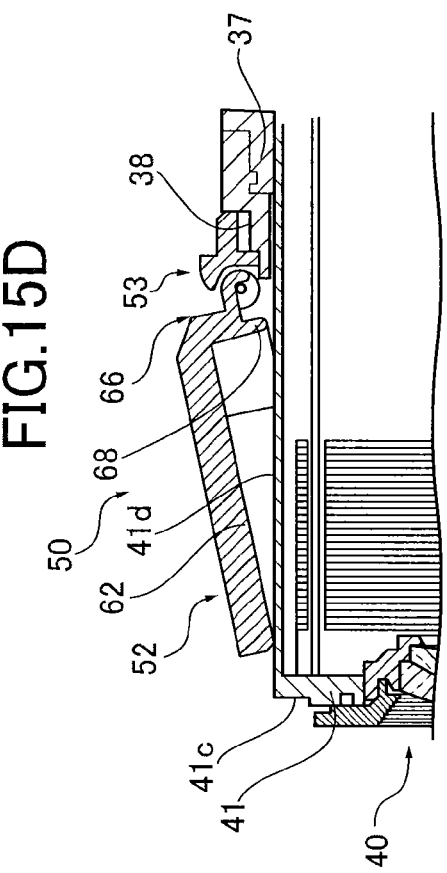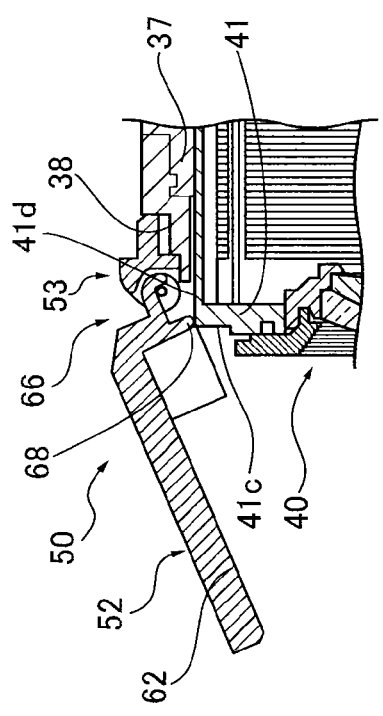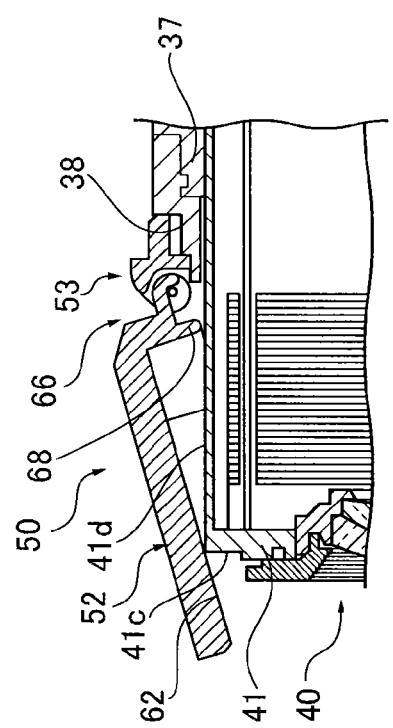

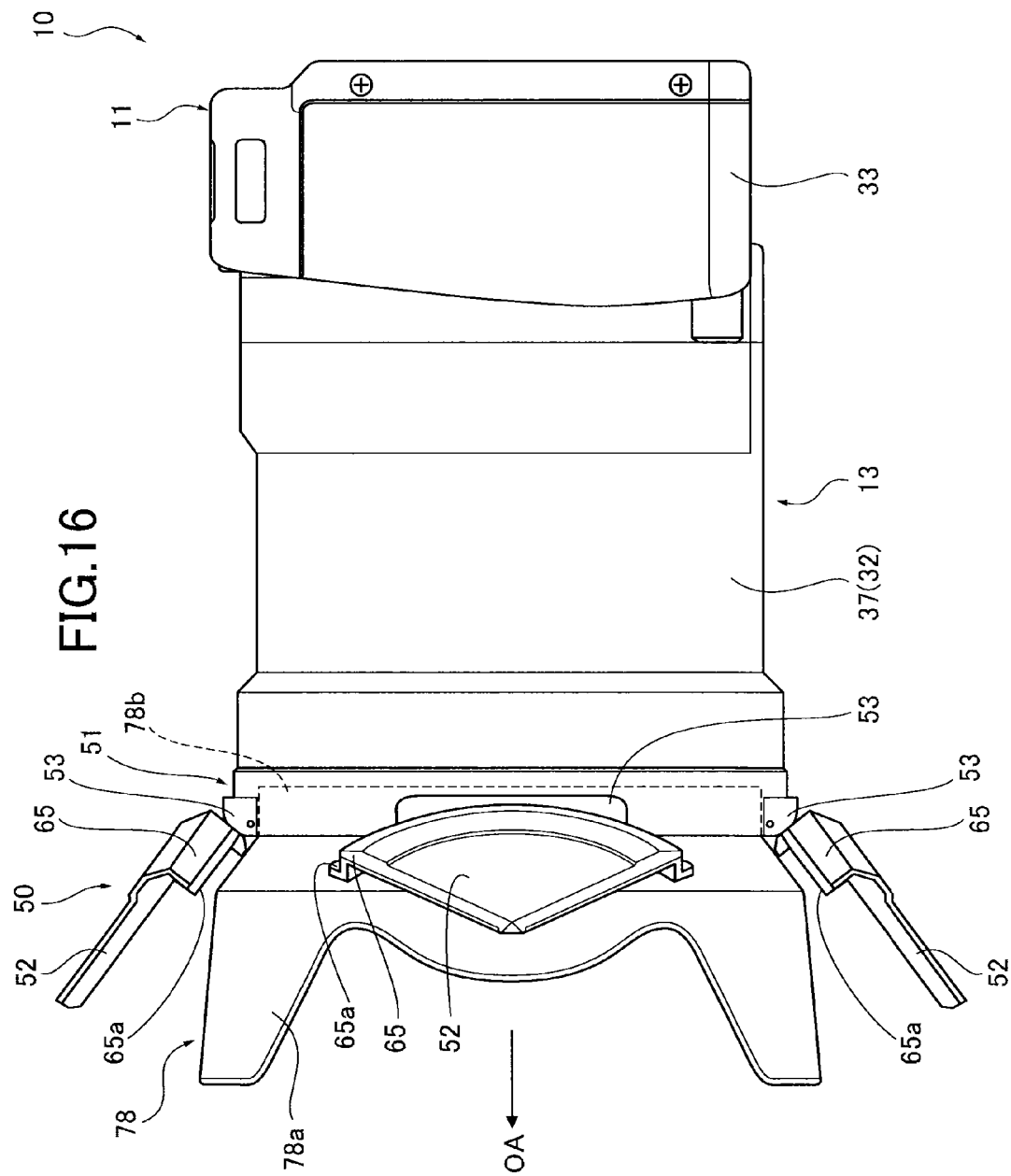

LENS CAP UNIT

CROSS-REFERENCE TO RELATED APPLICATION

This application is based on and claims the priority benefit of Japanese Patent Application No. 2011-272245, filed on Dec. 13, 2011, the disclosure of which is incorporated herein by reference in its entirety.

BACKGROUND OF THE INVENTION

1. Field of the Invention

The present invention relates to a lens cap unit used for imaging apparatuses such as digital cameras and so on.

2. Description of the Related Art

In a conventional imaging apparatus such as a digital still camera or digital video camera (hereinafter, referred to as digital camera), a lens barrel is used in which a movable lens cylinder to hold at least one lens is provided inside a fixed cylinder, and the movable lens cylinder is extended from the fixed cylinder and collapsed in the fixed cylinder. In such a lens barrel, it is known to protect a lens or lenses arranged in the lens barrel, in particular, the movable lens cylinder by mounting a lens cap on the fixed cylinder when the movable lens cylinder is collapsed in the fixed cylinder.

In such a lens cap, it is considered that an annular mounting part fixed to the fixed cylinder and at least one barrier rotatably provided on the mounting part to cover a leading end of the movable lens cylinder at an inner side of the mounting part are provided (for example, JP2009-258600). In the lens cap, when the movable lens cylinder is extended from the fixed cylinder, a back surface of the barrier is pressed by the leading end of the movable lens cylinder, and thereby the barrier is in an opening state. In addition, in the lens cap, when the movable lens cylinder is contained in the fixed cylinder, because the back surface of the barrier is not pressed by the leading end of the movable lens cylinder, the barrier is in a closed state. Because the barrier can be opened and closed in a state where the lens cap is attached to the fixed cylinder, it is not necessary for a user to attach the lens cap to the fixed cylinder and to detach from the fixed cylinder. Therefore, a high usability is accomplished.

However, in the lens cap as mentioned above, because the back surface of the barrier is pressed by the leading end portion of the movable lens cylinder, thereby the barrier is opened, if the lens cap is applied to a lens barrel configured to extend with a small extended amount from the fixed cylinder, there is a possibility that the barrier cannot be sufficiently opened.

SUMMARY OF THE INVENTION

An object of the present invention is to provide a lens cap unit capable of opening a barrier securely even if a lens barrel has a small extended amount from a fixed cylinder.

To accomplish the above object, a lens cap unit according to an embodiment of the present invention is mounted on a lens barrel including a fixed cylinder and a movable lens cylinder which is provided in the fixed cylinder and is extendable from and collapsible in the fixed cylinder in a direction of optical axis. The lens cap unit includes a mounting part mounted on the fixed cylinder, at least one barrier provided on the mounting part to be movable between a closed position covering a leading end portion of the movable lens cylinder and an opened position opening the leading end portion of the movable lens cylinder, and a cam protrusion provided on the barrier.

The barrier is supported on the mounting part to be rotatable about an opening and closing axis perpendicular to the optical axis. The cam protrusion is configured to extend from a surface of the barrier facing the movable lens cylinder and face the leading end portion of the movable lens cylinder, and to be disposed outside an effective diameter of the movable lens cylinder, in a state where the barrier covers a leading end portion of the movable lens cylinder.

BRIEF DESCRIPTION OF THE DRAWINGS

FIG. 11A to FIG. 11D are sectional views to explain a positional relationship of stepped portions of adjacent compartment wall portions in the closed barriers, in which FIG. 11A shows a relationship of side compartment wall portions of the first barrier and side compartment wall portions of the fourth barrier, FIG. 11B shows a relationship of side compartment wall portions of the second barrier and side compartment wall portions of the third barrier, FIG. 11C shows a relationship of side compartment wall portions of the second barrier and side compartment wall portions of the fourth barrier, and FIG. 11D shows a relationship of an inner compartment wall portions of the first barrier and an inner compartment wall portions of the second barrier.

FIG. 13 is a side view showing the digital camera with the lens barrel being partially shown in a cross-section and a part of the lens barrel being enlarged.

FIG. 14A to FIG. 14D are explanatory views each showing a state where each barrier of the lens cap unit is rotated depending a position of the movable lens cylinder relative to the fixed cylinder, in which FIG. 14A shows a state where the movable lens cylinder in contained and the barriers are closed, FIG. 14B shows a state where the cam protrusion engages with a leading end surface of a linearly-moving cylinder, FIG. 14C shows, and FIG. 14D shows a state where the cam protrusion engages with an outer circumferential surface of the linearly-moving cylinder to be in an adequate opening state.

FIG. 15A to FIG. 15D are explanatory views each showing a state where each barrier of the lens cap unit is rotated depending a position of the movable lens cylinder relative to the fixed cylinder, in which FIG. 15A shows a state where the cam protrusion engages with an outer circumferential surface of the linearly-moving cylinder to be in an adequate opening state, FIG. 15B shows a state where a rib protrusion portion engages with the leading end surface of the linearly-moving cylinder, FIG. 15C shows a state where the rib protrusion portion engages with the leading end surface of the linearly-moving cylinder, and FIG. 15D shows the rib protrusion portion engages with the outer circumferential surface of the linearly-moving cylinder.

FIG. 16 is an explanatory view showing the digital camera on which a lens hood is mounted, in a state where the lens cap unit is mounted on the fixed cylinder.

FIG. 17A and FIG. 17B are explanatory views showing a state where the lens hood is mounted on the lens barrel and the lens cap unit is mounted on the fixed cylinder, in which FIG. 17A shows a positional relationship between the lens cap unit and the lens hood, and FIG. 17B shows the lens cap unit as viewed from arrow A1O shown in FIG. 17A.

DETAILED DESCRIPTION OF THE PREFERRED EMBODIMENTS

Preferred embodiments of the present invention will be explained hereinafter in detail with reference to accompanying drawings.

Figure 17A:
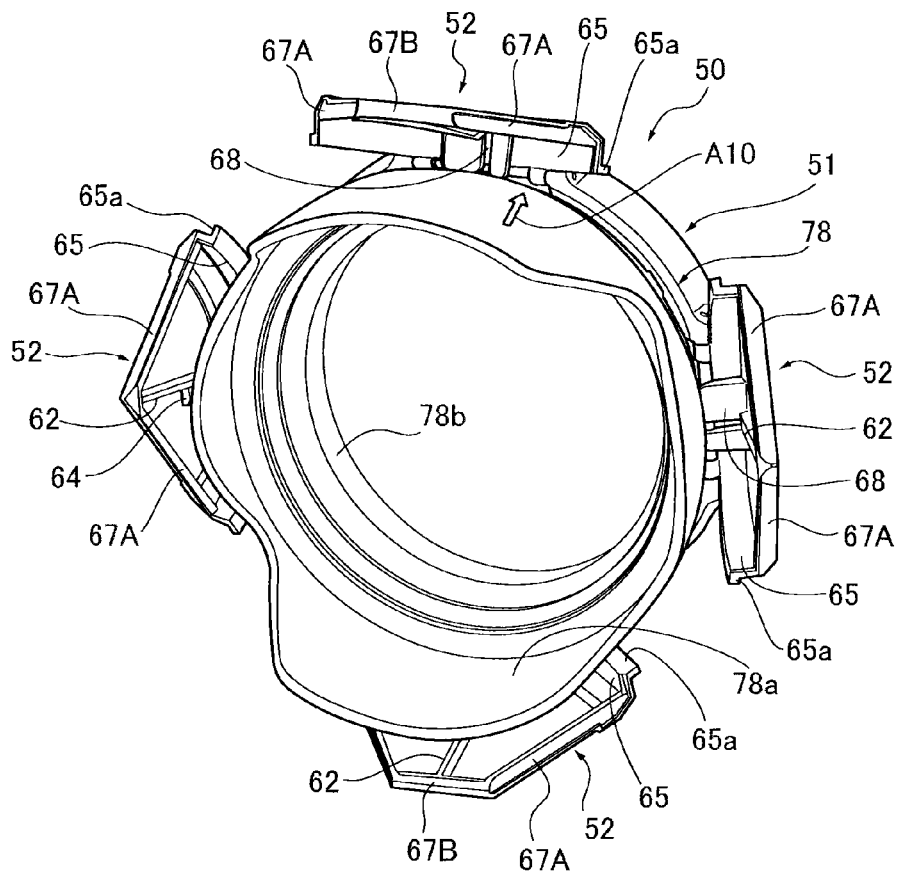

FIGS. 1 and 17 illustrate a schematic structure of a lens cap unit 50 according to an embodiment of the present invention and an imaging apparatus to which the lens cap is applied. In the embodiment, a digital camera 10 is shown as one example of the imaging apparatus.

The digital camera 10 to which the lens cap is applied is first explained with reference to FIGS. 1 to 4. The digital camera 10 includes a camera body 11 and a lens barrel 13 which is provided at a front side (side near an object as viewed in FIG. 1) of the camera body 11 and has a fixed cylinder 37 (described hereinafter) and a photographing optical system 12 provided in the fixed cylinder 37. In the illustrated embodiment, the lens barrel 13 is configured as a lens barrel unit which is removably mounted on the camera body 11. The photographing optical system 12 includes a plurality of optical members such as a first lens group 12a which is disposed at a side closest to an object, a fixed lens, a zoom lens, a shutter unit, an aperture stop unit and so on. The fixed lens, the zoom lens, the shutter unit, and the aperture stop unit are not shown in the drawings. The lens barrel 13 is configured to be movable along an optical axis or a photographing optical axis OA of the photographing optical system 12 between a collapsed position (FIG. 1A) where the photographing optical system 12 is contained in the fixed cylinder 37 and an extended position (FIG. 1B) or photographing standby position where the photographing optical system 12 is extended from the fixed cylinder 37.

The camera body 11 includes a power source switch 14 as an operation part, a shutter button 15, and a mode-switching dial 16 which are provided at an upper surface of the camera body 11 as viewed in FIG. 1. The power source switch 14 performs an operation (actuating operation) that actuates the digital camera 10 and an operation (stopping operation) that stops the digital camera 10. The shutter button 15 is a holding-down member that operates when the object is photographed. The mode-switching dial 16 sets various scene modes, a still-image mode, a moving-image mode and so on. Another operation switch 17 and a display 24 (including display surfaces) are provided on a back surface of the camera body 11 (see FIG. 2). A detailed structure of the operation switch 17 and the display are not omitted. The display 24 displays images based on image data which are photographed and recorded on a recording medium. The operation switch 17 indicates a direction to set a menu and so on, or acts as various switches.

In the digital camera 10, by a pressing down operation of the shutter button 15, an image of the object is imaged on a light-receiving surface of an imaging element 22 (see FIG. 3) which is described hereinafter, through the photographing optical system 12 so that the imaging element generates an electrical signal converting the photographed image of the object in image data. The photographing optical system 12 is configured to form a zoom lens system in which a focal distance is variable by a plurality of lens groups including the first lens group 12a, the shutter unit and aperture stop unit. The imaging element 22 which is described hereinafter is disposed at an imaging position of the photographing optical system 12 (see FIG. 3). In the specification, an optical axis (a rotationally symmetrical axis which is a central axis of the optical members including the first lens group 12a) of the photographing system 12 corresponds to the photographing optical axis OA of the lens barrel 13.

In the digital camera 10 shown in FIGS. 1A and 3, the power source is turned OFF (the power source switch 14 is in a state of OFF), and the photographing optical system 12 (including a movable lens cylinder 40 as mentioned below) is contained in the fixed cylinder 37 (an exterior 32). In the digital camera 10 shown in FIG. 1B, the power source is turned ON (the power source switch 14 is in a state of ON), and the photographing optical system 12 (movable lens cylinder 40 as mentioned below) is in the photographing standby position extended from the fixed cylinder 37 (exterior 32) as mentioned below in a direction of the photographing optical axis OA.

Figure 2:
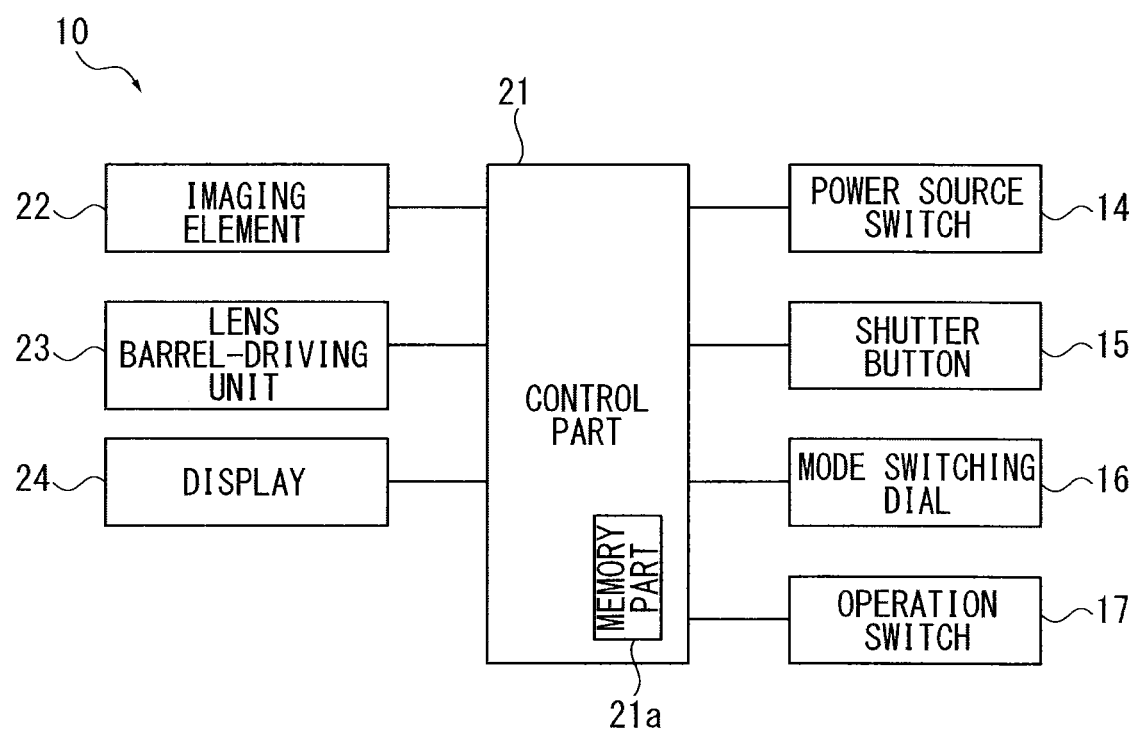
FIG. 2 is a block diagram showing a control part and so on that controls the digital camera.

As shown in FIG. 2, the digital camera 10 includes a control part 21, the imaging element 22, a lens barrel-driving unit 23 and the foregoing display 24. The control part 21 is configured to perform generally a drive process based on operations of the power source switch 14, the shutter button 15, the mode switching dial 16 and the operation switch 17, a process of the image data from the imaging element 22, and a control of a drive and so on of the lens barrel-driving unit 23 and the display 24, by means of a program stored in a memory part 21a. The control part 21 also acquires an image by the imaging element 22 through the photographing optical system 12, and is configured to display the image on the display 24 which is provided on a back surface of the camera body 11.

The imaging element 22 is formed by a solid-state image sensing device such as a CCD image sensor, a CMOS image sensor or the like. The imaging element 22 converts an object's image imaged on the light-receiving surface (see FIG. 3) of the imaging element through the photographing optical system 12 into image data and outputs an electrical signal corresponding to the image data. The output electrical signal is transmitted to the control part 21.

The lens barrel-driving unit 23 drives optical member-holding frames (not shown) for holding the optical members of the photographing optical system 12 by moving the movable lens cylinder 40, a linearly-moving cylinder 41 and so on relative to the fixed cylinder 37, as mentioned below, thereby the lens barrel 13 can be moved between the collapsed position (see FIG. 1A) and the photographing standby position (see FIG. 1B).

Figure 3:
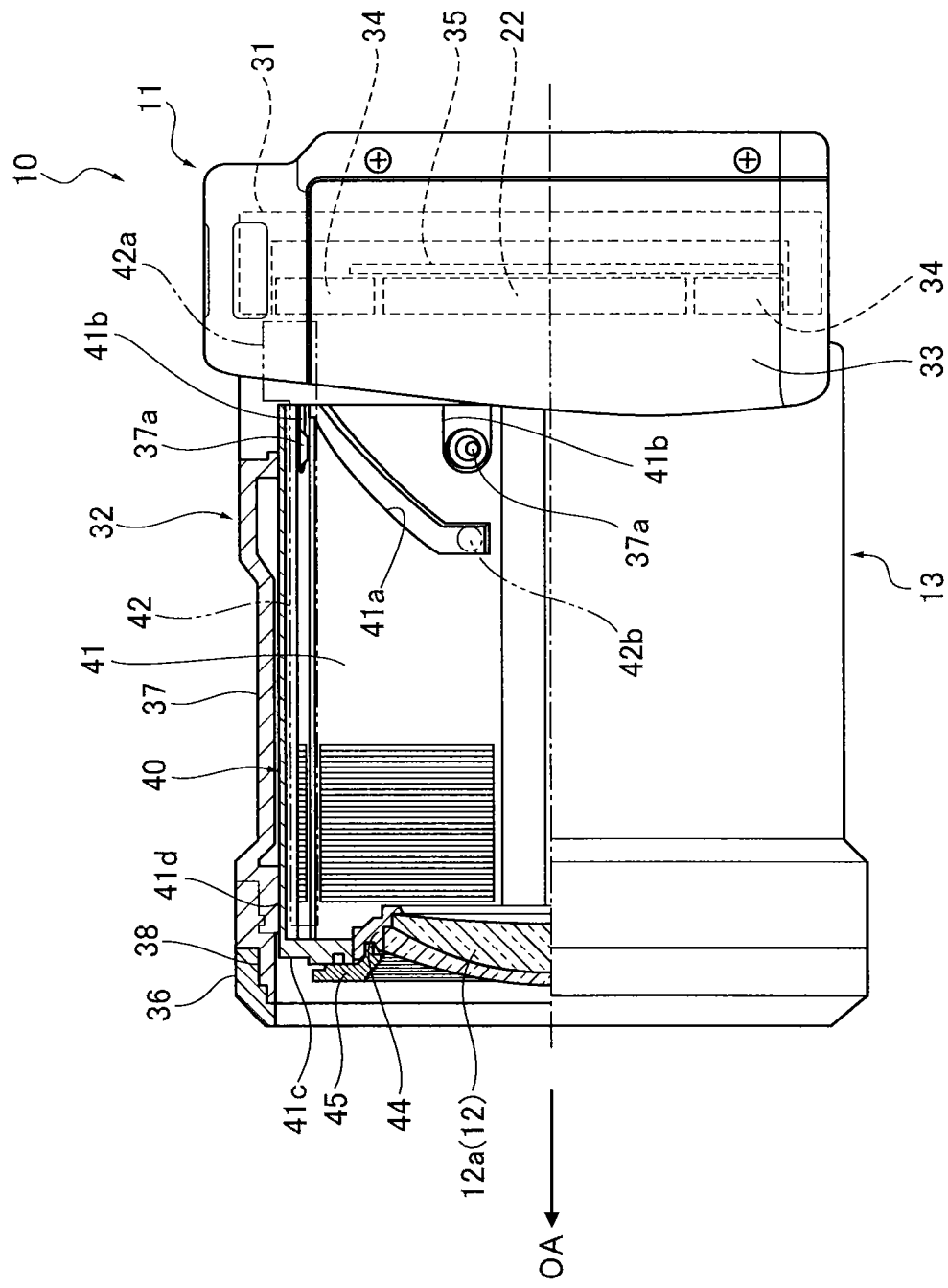
FIG. 3 is a side view showing the digital camera with the lens barrel being partially shown in a cross-section.

The lens barrel 13 is configured to hold movably the optical members including the first lens group 12a of the photographing optical system 12, along the photographing optical axis OA (see FIG. 3). Here, the digital camera 10 includes a housing 33 and a body portion 31 contained in the housing 33, as shown in FIG. 3. The housing 33 has a generally box-like shape (see FIG. 1). The body portion 31 constitutes a base portion of the lens barrel 13. The housing 33 is removably attached to the camera body 11, in the illustrated embodiment. The base portion 31 contained in the housing 33 includes a basic member 34, and a substrate 35 fixed to the basic member 34. Appropriate electronic parts (not shown) and the imaging element 22 are mounted on the substrate 35. The electronic parts constitute an electronic circuit part together with the imaging element 22. The body portion 31 is attached to the housing 33, and the basic member 34 is attached to the body portion 31. In addition, a driving device as the lens barrel-driving unit (see FIG. 2) for imparting a driving force to the linearly-moving cylinder as mentioned below is provided on the substrate 35. The exterior 32 is attached to the camera body 11, more specifically to the housing 33.

Figure 4:
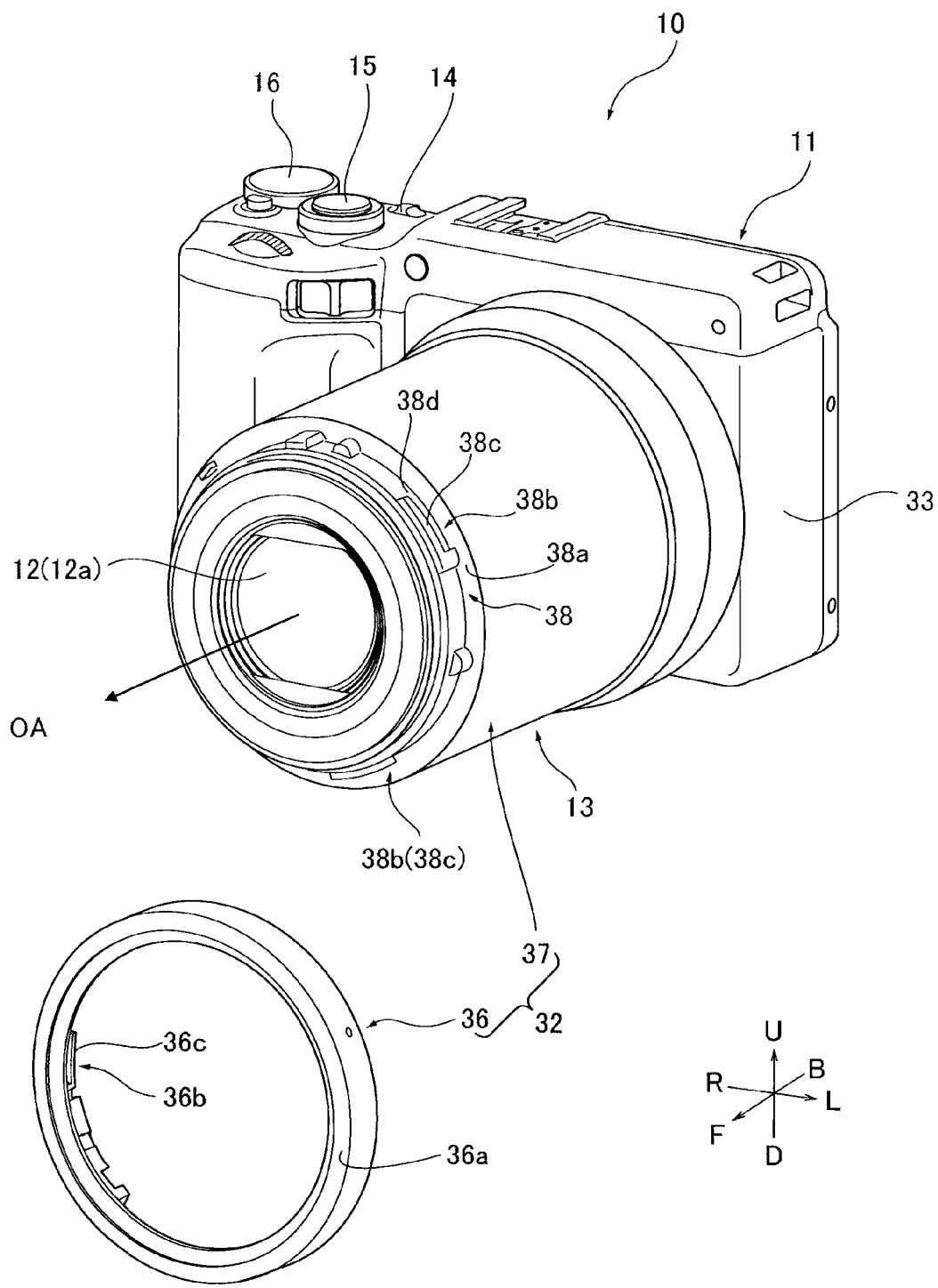
FIG. 4 is a perspective view of the digital camera in which a lens barrel side-connecting portion is provided on the lens barrel, with a ring cap being removed.
Figure 5A:
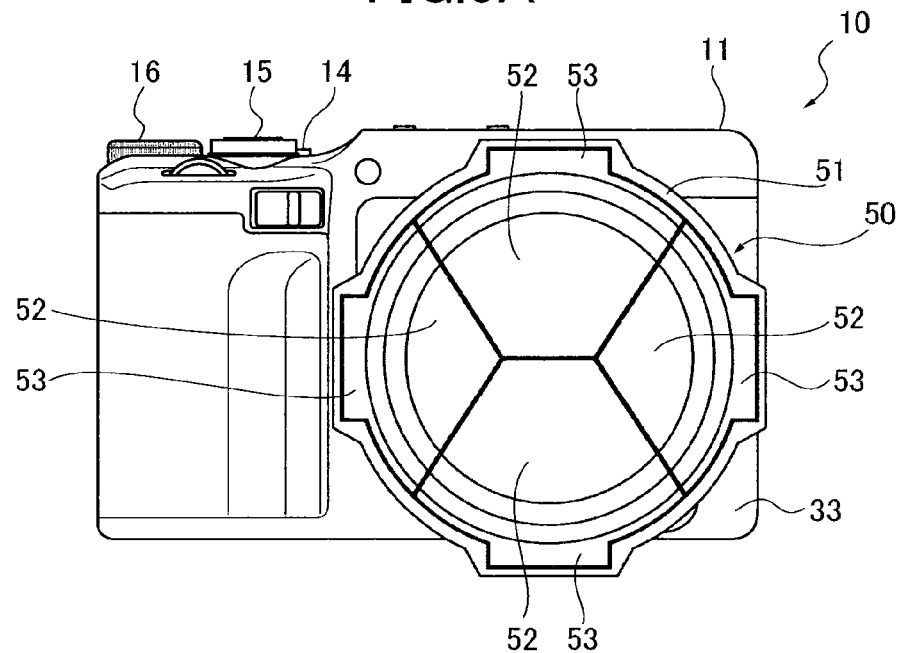
FIG. 5A is a front view of the digital camera on which the lens cap unit including first to fourth barriers is mounted, with the barriers being in a closed state.
Figure 5B:
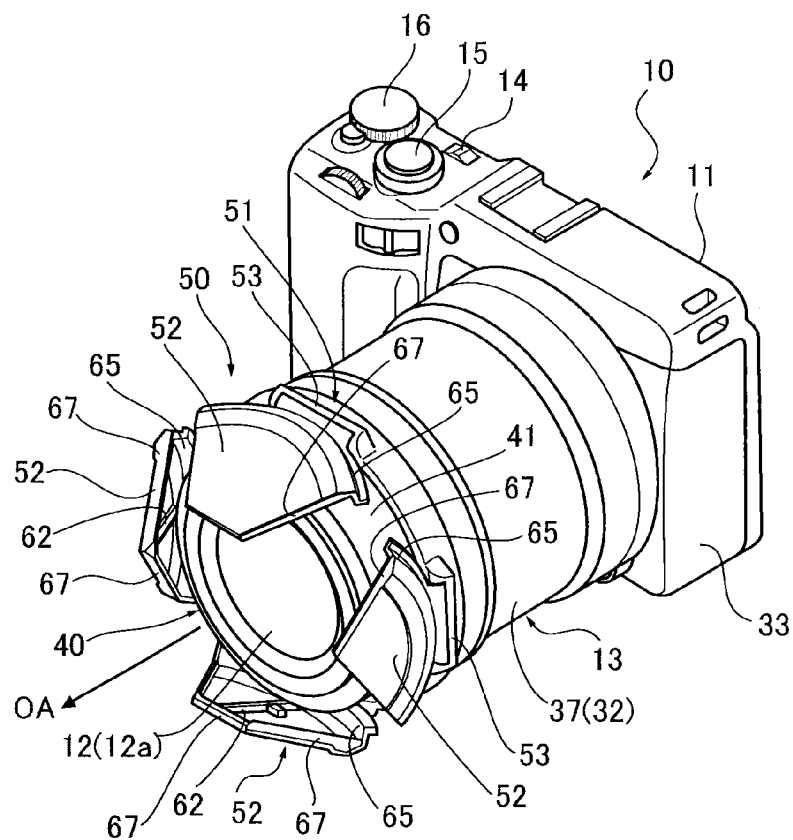
FIG. 5B is a perspective view of the digital camera, with the barriers being in an opened state.

The exterior 32 includes the fixed cylinder 37 and a ring cap 36. The fixed cylinder 37 has a generally cylindrical shape and is attached to a front end (object side) of the housing 33. A lens barrel side-connecting portion 38 is provided on a front end (object side) of the fixed cylinder 37, as shown in FIG. 4. The lens barrel side-connecting portion 38 can connect to and disconnect from one or more cap side-connecting portions 51a of a lens cap 50 device, or a ring side-connecting portion 36b of the ring cap, as mentioned below. The connection and the disconnection of the lens barrel side-connecting portion 38 to and from the cap side-connecting portions 51a of the lens cap unit 50, or the ring side-connecting portion 36b of the ring cap makes it possible to connect the lens cap 50 device or the ring cap 36 to the fixed cylinder 37, or disconnect it from the fixed cylinder 37. The lens barrel side-connecting portion 38 includes an annular concave portion or stepped portion 38a and three connection portions 38b. The annular concave portion 38a which is formed throughout the entire circumferential surface of the fixed cylinder 37 extends from a leading end toward the housing 33 in the direction of the photographing optical axis OA, and has an outer diameter smaller than an outer diameter of the fixed cylinder 38 (see FIG. 4).

The three connection portions 38b are arranged on the concave portion at equal intervals along a circumference of the fixed cylinder 37 (only two connection portions are shown in FIG. 4). Each of the connection portions 38 has a pawl portion 38c which is configured to protrude outwardly partially in a diametrical direction of the fixed cylinder and is formed in a curved shape along the circumference of the fixed cylinder 37. If a user fits the lens cap 50 or the ring cap 36 to the lens barrel side-connecting portion 38 and the lens cap 50 or the ring cap 36 is rotated in a clockwise direction on the concave portion 38a, the pawl portion 38c is formed in an opened portion 38d such that a pawl portion 51b of the lens cap unit 50 or a pawl portion 36c of the ring cap 36 is engaged with the pawl portion 38c, thereby so called bayonet type mounting mechanism is formed. In this way, the ring cap 36 or lens cap 50 device is mounted on the fixed cylinder through the lens barrel side-connecting portion 38.

The ring cap 36 is mounted on the fixed cylinder 37 to conceal a concave and convex shape of the lens barrel side-connecting portion 38. The ring cap 36 includes a ring body 36a and three ring side-connection portions 36b provided on an inner surface of the ring body 36a (FIG. 4 illustrates one). The ring body 36a has a cylindrical member having a size such that the stepped portion 38a and the three connection portions 38b of the lens barrel side-connecting portion 38 are contained in the ring cap 36.

The ring body 36a has an outer diameter equal to that of the fixed cylinder 37. When the ring cap is mounted on the fixed cylinder 37, a circumferential wall of the ring cap 36 is flush with a circumferential wall of the fixed cylinder 37 (see FIGS. 1 and 3), as viewed along the photographing optical axis OA.

The three ring side-connection portions 36b are arranged on the ring body 36a at equal intervals in a circumferential direction of the ring cap 36 and are configured to face the three connection portions 38b of the lens barrel side-connecting portion 38. Each of the three ring side-connection portions 36b has a pawl portion 36c which is protruded inwardly along a radial direction (centering on an axis) and curved along the circumferential direction. Each of the three ring side-connection portions 36b can be inserted into each of the connection portions 38b of the lens barrel side-connecting portion 38 of the fixed cylinder 37 through the opened portion 38d, by relative approach of the lend barrel 13 (digital camera 10) and the ring cap 36 in the photographing optical axis OA. In this way, by the relative approach of the lend barrel 13 (digital camera 10) and the ring cap 36, it is possible to configure the so-called bayonet-type mounting mechanism in which each pawl portion 36c of the ring cap 36 engages with each pawl portion 38c of the fixed cylinder 37.

The fixed cylinder 37 on which the ring cap 36 is mounted is fixed to the housing 33, more specifically, to the base member 34, as shown in FIG. 3. The fixed cylinder 37 includes an inner circumferential surface provided on a guide protrusion 37a. The guide protrusion 37a can be inserted in a linearly-moving groove 41b of the linearly-moving cylinder 41, as mentioned below. The guide protrusion 37a can, in the inserted state, be engaged with the linearly-moving cylinder 41. The linearly-moving cylinder 41 is fitted in the inner circumferential surface of the fixed cylinder 37.

The linearly-moving cylinder 41 has a generally cylindrical shape. The linearly-moving cylinder 41 has a circumferential wall in which an advancing and retreating cam groove 41a and the linearly-moving groove 41b are provided, as shown in FIG. 3. The advancing and retreating cam groove 41a is configured to be inclined with respect to the photographing optical axis OA to convert a rotation force of a rotation cylinder 42 as mentioned below into a linear movement force of the linearly-moving cylinder 41 along the photographing optical axis OA. The linearly-moving groove 41b is disposed along the photographing optical axis OA, and the guide protrusion 37a of the fixed cylinder 37 is fitted in the linearly-moving groove 41b to engage the linearly-moving cylinder 41 and the fixed cylinder 37. Therefore, the linearly-moving cylinder 41 can be moved relative to the fixed cylinder 37 along the photographing optical axis OA (linear movement), and cannot be rotated about the photographing optical axis OA. Meanwhile, the rotation cylinder 42 is fitted in an inner circumference of the linearly-moving cylinder 41.

The rotation cylinder 42 has a generally cylindrical shape. A key portion 42a is provided in an outer circumferential surface of the rotation cylinder 42, as shown in FIG. 3. The key portion 42a is formed to be protruded from a base end thereof toward an outer side in a radial direction along a plane perpendicular to the photographing optical axis OA, and is inserted in a guide groove (not shown) of the fixed cylinder 37. With such a configuration, the rotation cylinder 42 and the fixed cylinder 37 are prevented from being relatively moved in a direction of the photographing optical axis OA, but can be relatively rotated each other about the photographing optical axis OA. Therefore, the rotation cylinder 42 can be rotated relatively to the base member 34 about the photographing optical axis OA, while a position thereof in the direction of photographing optical axis OA being fixed.

The rotation cylinder 42 is provided with a gear portion (not shown). A gear provided on an output shaft of a drive device (not shown) as the lens barrel driving unit 23 (see FIG. 2) fixedly provided on the substrate 35, that is to say, the fixed cylinder 37 is engaged with the gear portion. With the configuration as mentioned above, the rotation cylinder 42 is rotated relatively to the fixed cylinder 37 in the linearly-moving cylinder 41 when a driving force of the drive device is transmitted to the gear portion through the gear engaged with the gear portion (this operation is not shown in the drawings).

The rotation cylinder 42 is provided with a cam protrusion 42b, as shown in FIG. 3. The cam protrusion 42b is provided to be protruded from the rotation cylinder 42 toward an outer side in a radial direction of the rotation cylinder and is inserted in the advancing and retreating cam groove 41a so that they can be engaged. Therefore, the rotation cylinder 42 causes the linearly-moving cylinder 41 to linearly move relative to the base member 34 (the fixed cylinder 37) in direction of the photographing optical axis OA along a cam locus of the advancing and retreating cam groove 41a in which the cam protrusion 42b is fitted, in accordance with the rotation of the rotation cylinder 42 relative to the fixed cylinder 37 about the photographing optical axis OA.

A leading end portion (object side) of the linearly-moving cylinder 41 is provided with a first lens holding frame 44 and an annular pressing member 45. The first lens holding frame 44 holds integrally the first lens group 12a of the photographing optical system 12, and a leading end of a circumferential edge of the first lens holding frame 44 is connected to the leading end portion of the linearly-moving cylinder 41. The first lens group 12a is formed by one or more lenses and includes an objective lens disposed at a position closest to the object in the photographing optical system 12. The annular pressing member 45 has a size smaller than the leading end portion of the linearly-moving cylinder 41 and an annular shape larger than a circumferential edge portion of a front surface of the first lens group 12a (objective lens). The circumferential edge portion is referred to as an outer side position of an effective area. The annular pressing member 45 is configured to surround the circumferential edge portion of the front surface of the first lens group 12a at the object side closer to the object than the linearly-moving cylinder 41 and the first lens holding frame 44, and is fixed to the leading end portion of the linearly-moving cylinder 41 by, for example, a fixing screw (not shown). Consequently, at a leading end of the lens barrel 13, a leading end surface 41c of the linearly-moving cylinder 41, configured to surround the pressing member 45 is exposed. Meanwhile, in FIG. 3, the exterior 32, the movable lens cylinder 40, the linearly-moving cylinder 41, the first lens holding frame 44, the first lens group 12a, and the annular pressing member 45 are shown with a partial cross-section, and the rotation cylinder 42, the base member 34, the substrate 35, and the imaging element 22 are shown by two-dotted line. In addition, a configuration provided inside the rotation cylinder 42 is omitted.

Inside the rotation cylinder 42 in which the linearly-moving cylinder 41 is fitted, there are adequately provided optical member holding frames to hold optical members other than the first lens group 12a of the photographing optical system 12 (see FIG. 1 and so on), other rotation cylinders or other liners and so on to move optical member-holding frames in the direction of the photographing optical axis. Moreover, on an inner circumferential surface of each of the linearly-moving cylinder 41 and the rotation cylinder 42, there are provided key protrusion portions of optical member containing frames provided inwardly (optical member holding frames, rotation cylinders, liners or the like), helicoids or the like, and linearly-moving grooves with which the helicoids or the like are engaged, to move the other optical members of the first lens group 12a of the photographing optical system 12 in the direction of the photographing optical axis. The optical members, the optical member holding frames, the other rotation cylinders or other liner and so on, as mentioned above are not shown in the drawings. Consequently, the fixed cylinder 37 (exterior 32), the linearly-moving cylinder 41, and the rotation cylinder 42 function as the optical member containing frames for the optical members of the photographing optical system 12 (see FIG. 1 and so on), together with the optical member holding frames, the other rotation cylinders, the other liners and so on. On the other hand, the lens barrel driving unit 23 functions as a containing frame driving device configured to drive the optical member containing frames by rotating the rotation cylinder 42 with the drive device (not shown).

In the lens barrel 13, when a driving force of the lens barrel driving unit 23 (drive device) (see FIG. 2) is transmitted to the gear portion of the rotation cylinder 42 through the gear engaged with the gear portion, the rotation cylinder 42 is rotated relatively to the fixed cylinder 37. Thereby, the linearly-moving cylinder 41 is extended from the contained (collapsed) position (see FIG. 1A) to the extended (photographing standby) position (see FIG. 1B), and is moved from an extended position thereof to the contained position. In this case, the optical members of the photographing optical system 12 are moved as predetermined. In the embodiment, the lens barrel 13 determines that a request for extending the photographing system 12 (movable lens cylinder) from the fixed cylinder 37 has been made when the power source switch 14 is switched from OFF state to ON state, and extends the photographing system 12 from the fixed cylinder 37 in the direction of the photographing optical axis into the photographing standby position (see FIG. 1B). In the embodiment, the photographing standby position as shown in FIG. 1B is shown in a state of a minimum extended amount of the movable lens cylinder 40 relative to the fixed cylinder 37 (exterior 32). This position is set as a wide angle of the movable lens cylinder 40 as mentioned below. Consequently, the linearly-moving cylinder 41 (movable lens cylinder 40) can be extended from the photographing standby position shown in FIG. 1B to the object side further (see FIG. 15D).

From the fact, the linearly-moving cylinder 41 contained inside the fixed cylinder 37 (exterior 32) is movable to be capable of advancing and retreating relatively to the fixed cylinder 37 (exterior 32) together with the optical member holding frames, the other rotation cylinders or the other liners, and so on (not shown), and functions as the movable lens cylinder 40 to move the optical parts (the first lens group 12a, or the other optical members) of the photographing optical system 12 in the direction of photographing optical axis OA.

Furthermore, the lens barrel driving unit 23 functions as the containing frame driving device to drive the optical member containing frames adequately by driving the rotation cylinder 42 with the drive device (not shown).

The leading end portion of the movable lens cylinder 40 is formed by the first lens group 12a (including the objective lens) of the photographing optical system 12, the annular pressing member 45 configured to surround the outer circumference of the first lens group 12a, and the leading end surface 41c of the leading end portion of the linearly-moving cylinder 41 (see FIG. 3), as mentioned above. An annular mounting member 76 can be mounted on the leading end portion of the movable lens cylinder 40 (see FIG. 13).

The annular mounting member 76 acts to be capable of attaching and detaching a mounting member (see an optical filter 77 shown in FIG. 13 or lens hood 78 shown in FIGS. 16 and 17) for the optical members and so on, as shown in FIG. 13. The annular mounting member 76 has a generally annular shape and thereby the incidence of photographing light incorporated in the photographing optical system 12 is not blocked. The annular mounting member 76 is provided at a back end (an end portion of an imaging surface side in a mounted state) thereof with an inner flange portion 76a. The annular mounting member 76 attached to the leading end surface 41c of the linearly-moving cylinder 41 by being inserting the inner flange portion 76a between the leading end surface 41c of the linearly-moving cylinder 41 and the annular pressing member 45. A mounting threaded groove 76b is provided on an inner circumferential surface of the annular mounting member 76. The mounting threaded groove 76b is configured to be capable of attaching the mounting member (the optical filter 77 shown in FIG. 13 or the lens hood 78 shown in FIGS. 16 and 17), different from the lens cap 50 or the ring cap 36.

Next, the lens cap 50 according to one embodiment of the present invention is described with reference to FIGS. 4 to 17.

Figure 6:
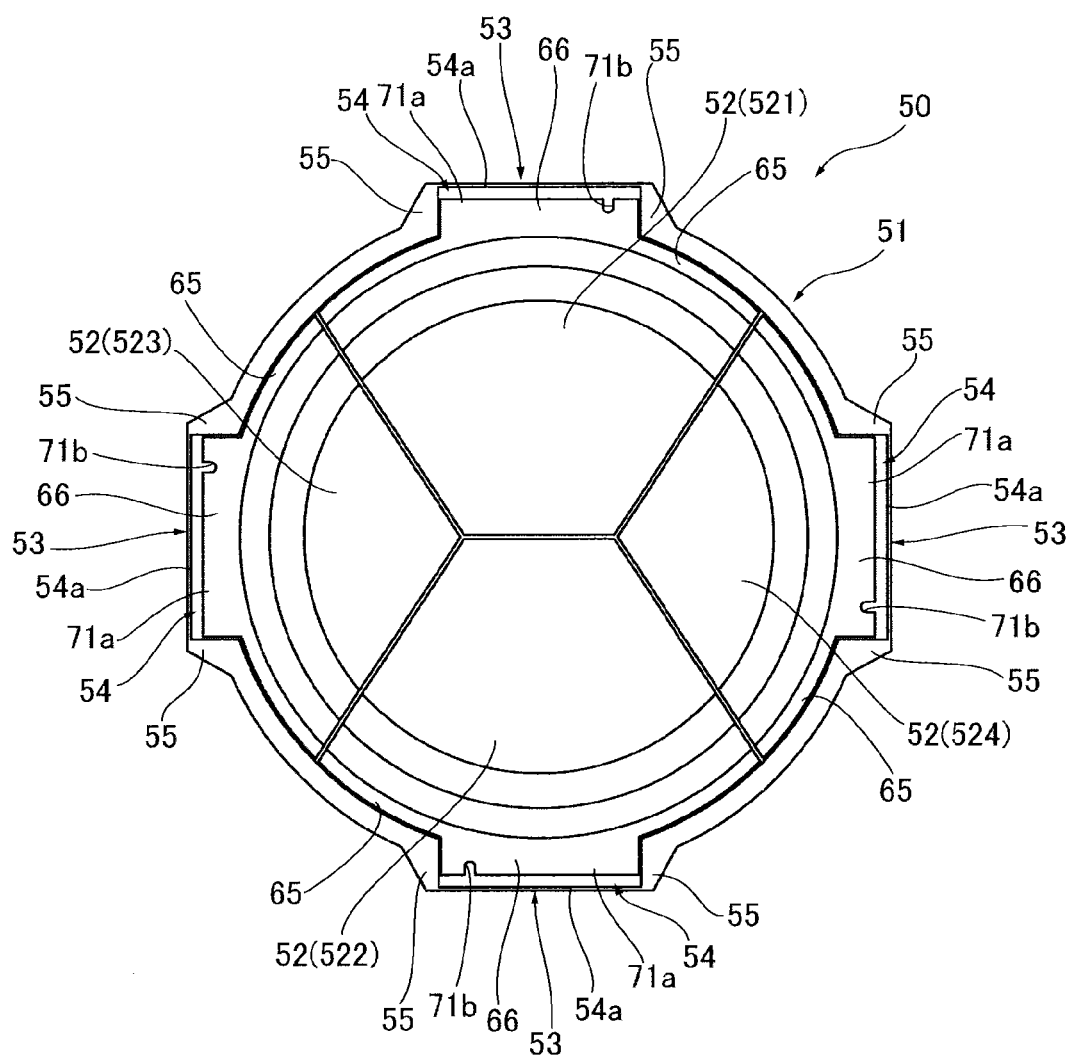
FIG. 6 is a front view showing the lens cap unit mounted on the digital camera.
Figure 7:
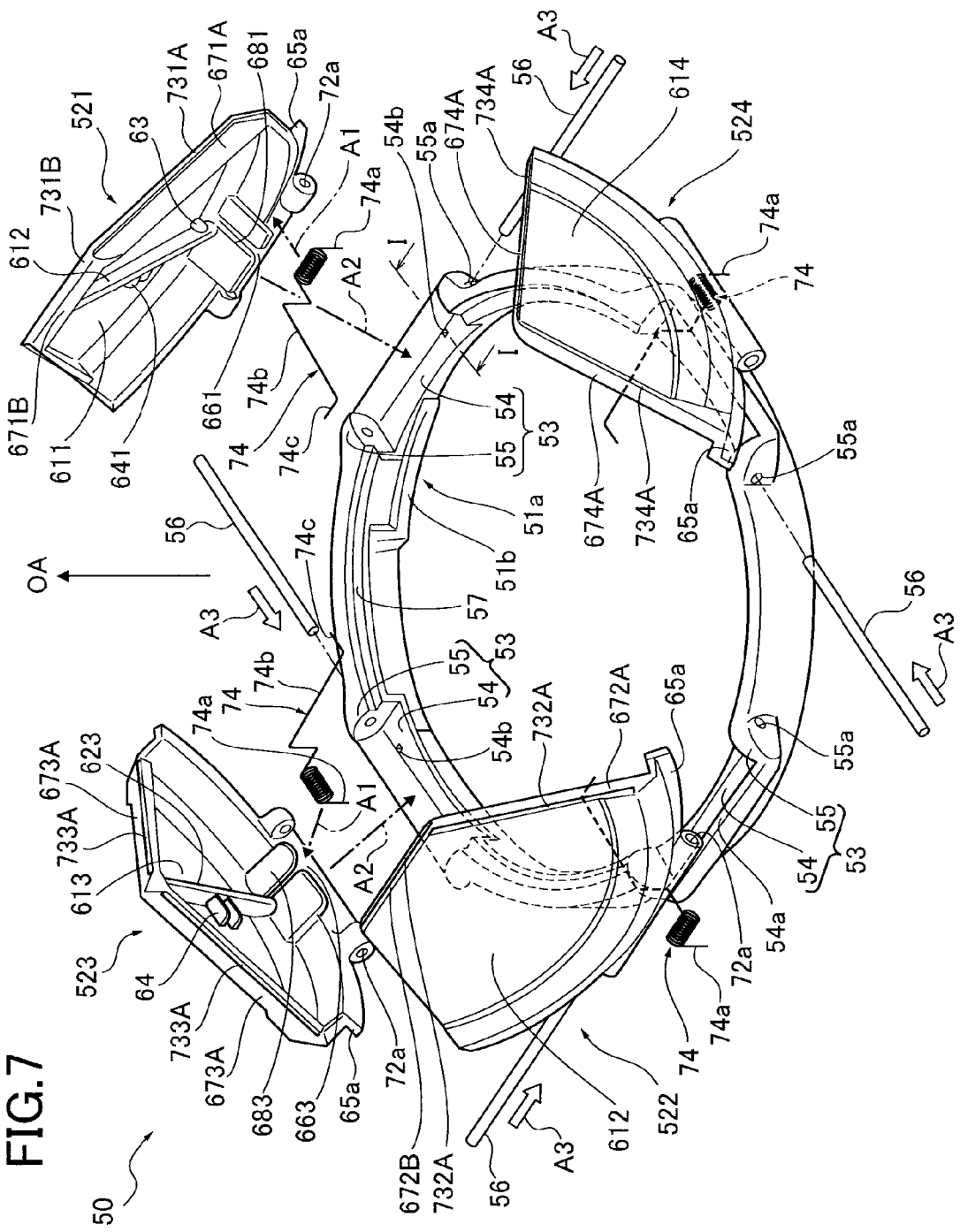
FIG. 7 is an exploded perspective view showing the lens cap unit.

The lens cap 50 is attached to the fixed cylinder 37 so as to cover the leading end portion of the lens barrel 13 to protect the lens barrel 13, in particular, the first lens group 12a (objective lens) of the optical elements of the photographing optical system 12 held at a leading end position of the movable lend cylinder 40, as shown in FIG. 5. The lens cap unit 50 is basically mounted on the fixed cylinder 37 (exterior 32) can perform operations between a state of protecting the lens barrel and a state of releasing the protected state by use of the movable lens cylinder 40 moved in the direction of the photographing optical axis OA relative to the fixed cylinder 37. The lens cap unit 50 includes an annular mounting part 51 mounted on the fixed cylinder 37, and at least one barrier 52 mounted on the mounting part 51 and closing one (object side) of opened side portions of the mounting part 51, as shown in FIGS. 5 to 7. In the illustrated embodiment, four barriers 52 are mounted on the mounting part 51. Of course, the barriers are not limited to this number. In the lens cap unit 50, because the annular mounting part 51 is mounted on the lens barrel 13 to surround the exterior 32, an axis of the mounting part 51 coincides with the photographing optical axis OA in the mounting state. Therefore, in the following description, basically, the direction of the photographing optical axis OA in the mounting state, and a radial direction perpendicular to the photographing optical axis OA are used. In addition, in the mounting part 51, the object side of photographing optical axis OA is referred to as a leading end side and the opposite side to the object side is referred to as a back end side.

The mounting part 51 is mounted on the fixed cylinder 37, specifically, the lens barrel side-connecting portion 38 (see FIG. 4) provided on the fixed cylinder 37, in the embodiment. The mounting part 51 has an annular shape having a size capable of surrounding the annular concave portion 38a. The mounting part 51 is provided on an inner surface thereof with the three cap side-connecting portions 51a (only one is shown in FIG. 7).

The three cap side-connecting portions 51a are provided on the mounting part 51 at equal intervals in a circumferential direction of the mounting part and are disposed to face the three connection portions 38b (see FIG. 4) of the lens barrel side-connecting portion 38, respectively. Each of the cap side-connecting portions 51a has the three pawl portions 51b which are protruded inwardly along the radial direction from the other opening end of the mounting part 51 (the body portion 31 (housing 33) side in the mounted state on the fixed cylinder). Each of the three pawl portions 51b can be engaged in each of the three connection portions 38b of the lens barrel side-connecting portion 38 from each opened portion 38d, the relative approach of the lens barrel 13 (digital camera 10) and the mounting part 51 (lens cap unit 50). Consequently, the engagement of the cap side-connecting portions 51a and the cap side-connection portions 38b by the relative rotation of the lens cap 51 and the fixed cylinder 37 makes it possible to form the bayonet type mounting mechanism in which the pawl portions 51b and 38c are fitted.

The barriers 52 are arranged to divide a circumference of the mounting part 51 into four numbers at equal intervals. Each of the barriers 52 is supported on the mounting part 51 to rotate about an axis perpendicular to the photographing optical axis OA at each of four attaching portions 66 by a supporting mechanism 53. As shown in FIG. 7, the supporting mechanism 53 for rotatably supporting each barrier includes a pair of spaced bearing protrusion portions 55 provided on the mounting part 51 and each having a shaft inserting hole 55a, a receiving concave portion 54 formed between the pair of bearing protrusion portions 55, a cylindrical portion which has a through-hole 72a and is provided on a back surface of each barrier and fitted in the receiving concave portion 54, and a shaft 56 inserted in the shaft inserting holes 55a of the bearing protrusion portions 55 and the through-hole 72a of the cylindrical portion. The supporting mechanisms 53 make it possible to support the barriers 52 on the mounting part 51 to be capable of opening and closing an opening of the fixed cylinder 37, in other words, covering and uncovering the first lens group 12a.

Figure 8:
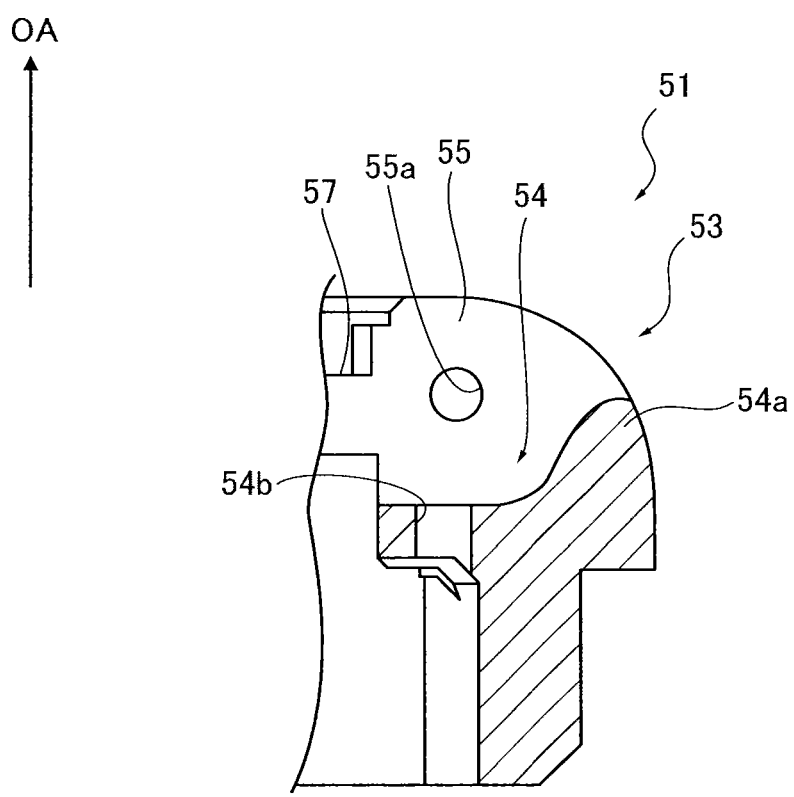
FIG. 8 is a sectional view taken along line I-I in FIG. 7.

The receiving concave portion 54 is formed by partially cutting an upper surface of the mounting part 51. As shown in FIG. 8, the receiving concave portion 54 is formed to include an inner side surface having a flat surface substantially perpendicular to the photographing optical axis OA, a curved surface extending upward from the flat surface, and an outer edge portion 54a extending from the curved surface. The outer edge portion 54a is configured to be inclined backwardly as going to an outer side as viewed in FIG. 8 to secure a rotation range (maximum opening state (see FIGS. 16 and 17)) of each barrier 52 disposed in the receiving concave portion 54. In each of the receiving concave portions 54, a fixing hole 54b is provided in the flat surface substantially perpendicular to the photographing optical axis OA. The fixing hole 54b is set to have a size capable of receiving one end 74a of a pressing member, for example, a torsion spring 74 as mentioned below (see FIG. 17B).

The pair of bearing protrusion portions 55 is disposed at both sides of the receiving concave portion 54, as shown in FIG. 7 and is configured to be protruded from an upper surface of the receiving concave portion 54. The shaft inserting holes 55a extend in a tangent direction to a circle centered on the photographing optical axis OA and is arranged on the same linear line. In each supporting mechanism 53, each barrier can rotatably be supported by inserting the shaft 56 in the shaft inserting holes 55*a* of the bearing protrusion portions 55 and the through-hole 72*a* of the cylindrical portion from one of the pair of shaft inserting holes 55*a* (see FIG. 10).

The mounting part 51 is provided at an upper circumferential edge portion thereof (object side) with an annular inner edge cut 57. The annular inner edge cut 57 is formed by cutting an inner side of the mounting part 51 into an L-character like shape along a circumferential direction centered on the photographing optical axis OA. In the embodiment, as mentioned above, because the four supporting mechanisms are provided on the outer circumferential portion of the mounting part 51, the annular inner edge cut 57 is provided among the supporting mechanisms.

As mentioned above, the four barriers 52 are configured to divide the opening of the object side of the mounting part 51 into four, as shown in FIGS. 6 and 7. The barriers 52 are mounted on the mounting part 51 by the supporting mechanisms 53 and are arranged along the circumferential direction of the mounting part 51 to cover the opening of the mounting part 51 (see FIGS. 5A and 6). In the following description, a state of the barriers 52 covering the opening of the mounting part 51 is referred to as a closed state. Also, the four barriers are referred to as a first barrier 521, a second barrier 522, a third barrier 523, and a fourth barrier 524, respectively. The first and second barriers 521, 522 are disposed to face each other, and the third and fourth barriers 523, 524 are disposed to face each other (see FIG. 6).

A supporting side portion (outer side) of each of the barriers 52 supported by the supporting mechanism 53 has a circular arc shape (a shape along the mounting part 51) dividing the mounting part 51 into four at equal intervals. Moreover, an inner end portion of each of the first barrier 521 and the second barrier 522 close to the photographing optical axis OA when they are in the closed state has a straight line portion perpendicular to the photographing optical axis OA, and an inner end portion of each of the third barrier 521 and the fourth barrier 522 close to the photographing optical axis OA when they are in the closed state has an apex portion which has an apex formed at each of both ends of the first barrier 521 and the second barrier 522 disposed to face each other. The barriers 52 have basically the same construction except a shape of a planar portion 61 (a compartment wall portion 67) as mentioned below. Therefore, the basic configuration is first described by use of the first barrier 521. Meanwhile, with respect to reference number of each barrier 52, the reference number is basically shown with two-digit number, in case of describing the four barriers separately, a character, the numeral, n is attached to the last number of the reference number as n barrier 52 *n* (in case of the planar portion 61 of the first barrier 521, a planar portion 611).

Figure 9A:
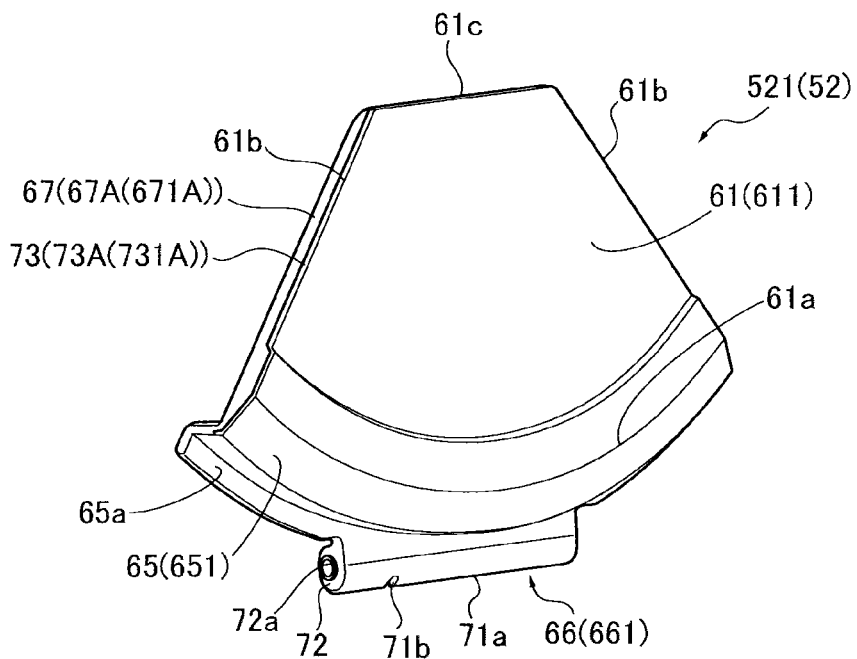
FIG. 9A is a perspective view showing one of the barriers of the lens cap unit, as viewed from an object side.
Figure 9B:
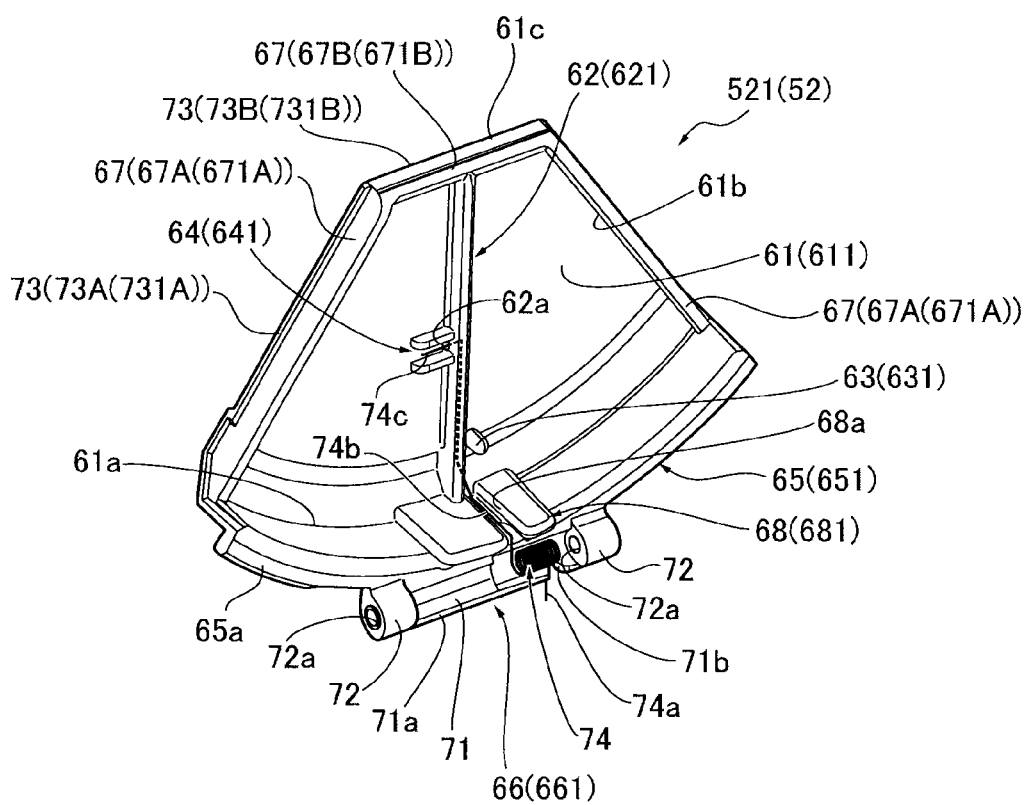
FIG. 9B is a perspective view showing the barrier, as viewed from a back surface thereof.

As shown in FIG. 9, the first barrier 521 includes the planar portion 61 (611), a rib protrusion portion 62 (621), a first auxiliary protrusion 63 (631), a second auxiliary protrusion 64 (641), an outer wall portion 65 (651), one or more attaching positions 66 (661), and a compartment wall portion 67 (671A and 671B). The supporting mechanism 53 for each barrier is provided on each attaching portion 66. Generally speaking, a barrier driving device is provided between the barrier 52 and the movable lens cylinder 40. The barrier driving device comprises, for example, a cam protrusion 68 (681) provided on each barrier. The barrier driving device is described hereinafter. The planar portion 61 of each barrier has a flat plated-shape and is disposed along a plane perpendicular to the photographing optical axis OA to close the opening of the mounting part 51 when the barrier is in the closed state. The planar portion 61 includes a circular arc-shaped outer edge portion 61*a* and side edge portions 61*b* formed linearly to approach each other while forming an angle to the outer edge portion 61*a* and disposed adjacent to the third barrier 523 and the fourth barrier 524. Furthermore, the planar portion 61 includes an inner edge portion 61*c* disposed adjacent to the second barrier 522. The inner edge portion 61*c* is formed by a straight line forming equal angles to the side edge portions 61*b* and connecting to the side edge portions 61*b*. With respect to a shape of the planar portion 61, the third barrier 523 and the fourth barrier 524 differ from the first barrier 521. This is described hereinafter. The rib protrusion portion 62 is provided on the planar portion 61.

As shown in FIG. 9, the rib protrusion portion 62 is provided on a back surface of the planar portion 61 to extend in a radial direction of the mounting part between the outer edge portion 61*a* and the inner edge portion 61*c*, upon a line connecting a center of the outer edge portion 61*a* and a center of the inner edge portion 61*c*. In addition, the rib protrusion portion 62 projects from the back surface of the planar portion 61. In the embodiment, a protruded amount of the rib protrusion portion 62 from the planar portion 61 is constant (see FIG. 14). A through-hole 62*a* passing through the rib protrusion portion 62 is provided in the rib protrusion portion 62 at an intermediate position of the rib protrusion portion 62. The through-hole 62*a* is configured to have a size capable of passing a leading end portion 74*c* of the other end 74*b* of the torsion spring 74 as mentioned hereinafter. The rib protrusion portion 62, when the first barrier 521 is closed, is adapted to face the movable lens cylinder 40. Consequently, a leading end of the rib protrusion portion 62 is, when the first barrier 521 is closed, disposed at a position closest to the movable lens cylinder 40.

The first auxiliary protrusion 63 extends in a radial direction of the mounting part 51 and projects from the surface of the planar portion 61 toward the photographing optical axis OA. The first auxiliary protrusion 63 is provided parallel to the rib protrusion portion 62 at a position between the end portion of the outer edge portion 61*a* and a position where the through-hole 62*a* is provided. The first auxiliary protrusion 63 is disposed to have a space between the first auxiliary protrusion 63 and the rib protrusion portion 62. The other end 74*b* of the torsion spring 74 can be received in the space.

The second auxiliary protrusion 64 is formed by two spaced protrusion pieces each having a plated shape protruded from the back surface of the planar portion 61 and extending to be perpendicular to the rib protrusion portion 62. The second auxiliary protrusion 64 is positioned such that the through-hole 62*a* is disposed between the protrusion pieces. A leading end portion 74*c* of the other end 74*b* is received between the projection pieces.

The outer wall portion 65 is formed to continue to the outer edge portion 61*a* of the planar portion 61, has a plated shape curved along the outer edge portion 61*a*, and is configured to protruded from the back surface of the planar portion 61 and extend along the photographing optical axis OA. The outer edge portion 65 constitutes a circumferential wall portion of the lens cap 50 together with the mounting part 51 when the first barrier 52 is closed (see FIGS. 5 and 10). The outer edge portion 65 has at a back end portion thereof a flange portion 65. The flange portion 65 is formed to be protruded outwardly from an outer circumferential surface of the back end of the outer wall portion 65 in the radial direction, and provided throughout the entire area of the back end of the outer wall portion 65. The flange portion 65*a* has, when the first barrier 521 (barrier 52) mounted on the mounting part 51 is closed, a size and a shape able to be fitted in the inner edge cut 57 of the mounting part 51 (see FIG. 10). The outer wall portion 65 is provided with the attaching portion 66.

The attaching portion 66 constitutes a portion to attach each barrier to the supporting mechanism 53 and disposed at a central portion in a circumferential direction of the outer wall portion 65. The attaching portion 66 includes a receiving portion 71 and a pair of bearing portions 72. The receiving portion 71 is configured to be protruded outwardly in the radial direction from the flange portion 65a of the outer wall portion 65, and formed by cutting partially a central portion of a circular cylindrical shape portion of circular extending in a tangential direction to a circle centering on the photographing optical axis OA, in a circular cylindrical shape. Therefore, the receiving portion 71 is provided at an outer side in the radial direction thereof with an outer edge portion 71a (see FIG. 14). The receiving portion 71 constitutes a portion to receive the shaft 56 and the torsion spring 74. In addition, the pair of bearing portions 72 is formed at both ends of the receiving concave portion 71 by cutting the central portion of the circular cylindrical shape portion as the receiving portion 71. The receiving portion 71 and the pair of bearing portions 72 (the circular cylindrical shape portion constituting them) have a size such that they are contained in the receiving concave portion 54 of the supporting mechanism 53 of the mounting part 51 (see FIGS. 7 and 14). The outer edge portion 71a has, when the first barrier 521 (barrier 52) mounted on the mounting part 51 is closed, a size significantly limiting an exposure inside the supporting mechanism 53 (receiving concave portion 54) in cooperation with the outer edge portion 54a of the supporting mechanism 53 of the mounting part 51 (see FIGS. 6 and 13). In the embodiment, the outer edge portion 71a has a size configured to extend to an outer side in a radial direction of the shaft 56 (see FIG. 13). The outer edge portion 71a is provided with a cut groove 71b. The cut groove 71b is configured to be capable of receiving one end 74a of the torsion spring 74 contained in the receiving portion 71 (see FIG. 1B). The cut groove 71b is configured to prevent the interference of the one end 74a of the torsion spring 74 and the outer edge portion 71a, when the attaching portion 66 (receiving portion 71 (outer edge portion)) is rotated relatively in the supporting mechanism 53 of the mounting part 53, to move the first barrier 521 (barrier 52) to the maximum opening state (see FIGS. 16 and 17).

The pair of bearing portions 72 is provided at the both ends of the receiving portion 71 as viewed in the tangential direction to the circle centering on the photographing optical axis OA, as mentioned above. The bearing portions 72 are provided with shaft holes 72a each having an axis arranged on the same straight line extending in the tangential direction as mentioned above. The shaft 72 is inserted in the shaft holes 72a. Consequently, each barrier is rotatably supported on the mounting part 51 by inserting the shaft 56 in the through-holes 72a and the shaft inserting holes 55a from one direction (shown by arrow A3 in FIG. 7) in the state where the receiving portion 71 is contained in the receiving concave portion 54.

The compartment wall portion 67 is configured to continue to the outer end edge portion except the outer edge portion 61a of the planar portion 61, has a flat plated portion provided along the continued outer edge portion, is formed by being protruded from the back surface of the planar portion 61 to a direction of the photographing optical axis OA. In other wards, the compartment wall portion 67 is disposed on a position where the outer wall portion 65 is not provided, in the outer edge portion of the planar portion 61. The compartment wall portion 67 is configured to define a boundary position between the compartment wall portion 67 and the first barrier 521 (each barrier 52) which are adjacent to each other. In the embodiment, a protruded amount of the compartment wall portion 67 from the back surface of the planar portion 61 is constant. Therefore, the first barrier 521 includes a pair of side portions (side compartment wall portions 67A (671A)) continuous to both side edge portion 61b and an inner side compartment wall portion 67B (671B) continuous to the side portions, as the compartment wall portion 67. A stepped portion 73 is provided on each of the compartment wall portions 67A, 67B.

Each of the stepped portions 73 is protruded radially from each compartment wall portion 67, and extends throughout an entire length of the corresponding compartment wall portion 67. A configuration of the compartment wall portion 67 and the stepped portion 73 in the first barrier 521 differs from that of each of the second barrier 522, third barrier 523, and the fourth barrier 524. This is described hereinafter.

The barrier driving device, for example, the cam protrusion 68 is formed to be protruded along a direction of the photographing optical axis OA from the back surface of the first barrier 521 and has a flat plated shape extending in a tangential direction to a circle centering on the photographing optical axis OA. The cam protrusion 68 is configured to be positioned at an inner side than an outer circumferential position of the leading end portion of the movable lens cylinder 40 and at an outer side than an effective diameter of the photographing optical system 12 (movable lens cylinder, or the first lens group 12a (objective lens)), as viewed from the radial direction of the first lens group when the first barrier 521 (each barrier 52) mounted on the mounting part 51 is closed. Here, the effective diameter means an aperture in which light passes. Generally speaking, the barrier driving device or the cam protrusion 68 engages with the movable lens cylinder at a position outside an effective diameter of the movable lens cylinder as the movable lens cylinder is extended from the fixed cylinder. In the embodiment, the cam protrusion 68 is disposed to face the leading end surface 41c of the linearly-moving cylinder 41 disposed at the leading end portion of the movable lens cylinder 40 in the direction of the photographing optical axis OA, as viewed in the radial direction of the linearly-moving cylinder 41 (see FIG. 14A). The cam protrusion 68 is disposed at a position close to the outer wall portion 65, that is to say, the attaching portion 66 supported rotatably on the supporting mechanism 53 (receiving concave portion 54) of the mounting part 51. The rib protrusion portion 62 is configured to continue to a place (a protruding base of the cam protrusion 68) protruding from the back surface of the first barrier 521. A protruded amount of the cam protrusion 68 from the back surface of the first barrier 521 is set from a view capable of opening the first barrier 521 (each barrier 52) to a required opening state (see FIG. 14). The setting of the protruded amount of the cam protrusion 68 from the back surface of the first barrier 521 differs from that of the second barrier 522, the third barrier 523, and the fourth barrier 524 (see FIG. 12). These are described hereinafter. In the embodiment, a divided groove 68a is provided in the cam protrusion 68 at an intermediate position of the cam protrusion 68, as viewed in the tangential direction. The other end 74b of the torsion spring 74 disposed in the receiving concave portion 71 can be received in the divided groove 68a.

Next, a difference of c configuration of the first barrier 521, the second barrier 522, the third barrier 523, and the fourth barrier as mentioned above is described hereinafter.

As shown in FIGS. 6 and 7, an outer shape of the second barrier 522, that is to say, a shape of the planar portion 612 and a configuration of the compartment wall portion 672 (672A, 672B) is equal to that of the first barrier 521. The stepped portion 732 (732A, 732B) provided on the compartment wall portion 672 of the second barrier 522 differs partially from the stepped portion 731 provided the first barrier 521 in configuration. The second barrier 522 includes a stepped portion 732A provided on the inner compartment wall portion 672 and configured to be protruded from a back end of the inner compartment wall portion (see FIGS. 7 and 11D). Meanwhile, the stepped portions 732A on the both side compartment wall portions 672A are configured to be protruded from an end portion of each of the side compartment wall portions, similarly to the first barrier 521 (see FIGS. 11B and C).

The inner end of each of the third barrier 523 and the fourth barrier 524 at the photographing optical axis OA side has the apex portion in the state where it is closed, as mentioned above. An outer shape of the planar portions 613 and 614 includes a circular arc shaped back end portion (a portion corresponding to the outer edge portion 61a of the first barrier 521), straight line shaped both side edge portions (portions corresponding to the side edge portions 61b of the first barrier 521) extending from both ends of the back end portion, and the apex portion in which the both side edge portions crosses. Each of the third barrier 523 and the fourth barrier 524 has no portion corresponding to the inner edge portion 61c (see FIG. 9) of the planar portion 61 of the first barrier 521 (and the second barrier 522). Therefore, in the third barrier 523 and the fourth barrier 524, only either both side compartment wall portions 673A, or both side compartment wall portions 674A as compartment wall portions 673, or compartment wall portions 674 are provided. A stepped portion 733A provided on each of the both side compartment wall portions 673A of the third barrier 523 differs from that of the first barrier 521 and is protruded from a back end of the side compartment wall portion (see FIGS. 10 and 11B). On the other hand, A stepped portion 734A provided on each of the both side compartment wall portions 674A of the fourth barrier 524 differs from that of the first barrier 521 and is protruded from a back end of the side compartment wall portion (see FIGS. 11A and 11C).

Figure 10:
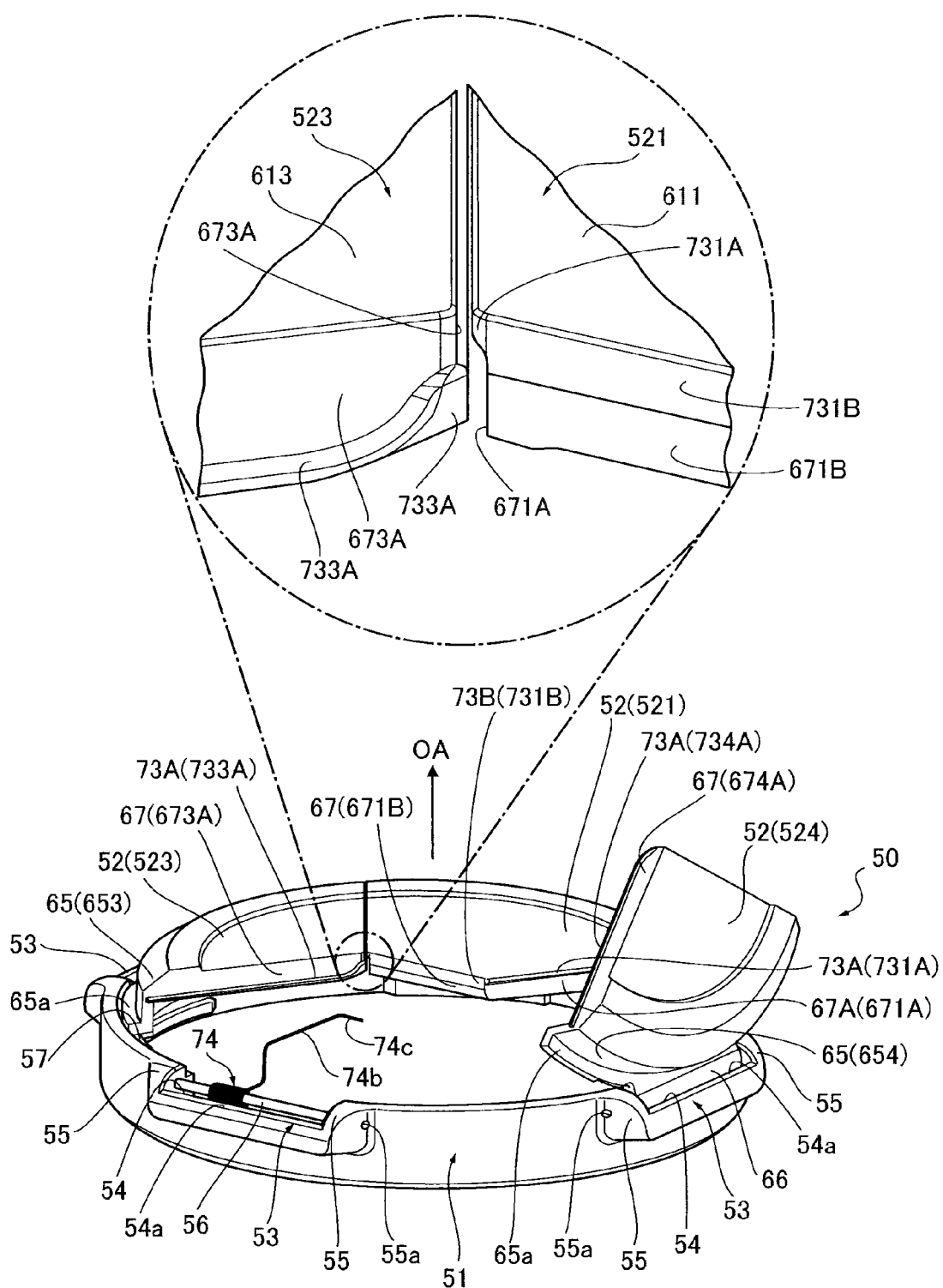
FIG. 10 is a perspective view of the lens cap unit showing a positional relationship between a stepped portion of a side compartment wall portion of a closed first barrier and a stepped portion of a side compartment wall portion of a closed third barrier, with a part of the lens cap unit being shown in an enlarged state.

For the aforementioned configuration, when the four barriers 52 are closed, the both side compartment wall portions 671A of the first barrier 521 and both side compartment wall portions 672A of the second barrier 522 are arranged parallel with the both side compartment wall portions 673A of the first barrier 523 and both side compartment wall portions 674A of the second barrier 524 in the radial direction (a direction perpendicular to the photographing optical axis OA), when the first to fourth barriers are closed (see FIGS. 6 and 7). At this time, as shown in FIG. 10, the stepped portion 731A of each of the side compartment wall portions 671A of the first barrier 521 and the stepped portion 733A of each of the side compartment wall portions 673A of the third barrier 523 are set to be arranged parallel with each other in the direction of the photographing optical axis OA. Here, because the stepped portion 731A is disposed at the leading end or front end side of each side compartment wall portion and the stepped portion 733A is disposed at the back end side of each side compartment wall portion, the stepped portion 731A is disposed at the leading end side (object side) and the stepped portion 733A is disposed at the back end side (lens barrel 13 side), and these stepped portions are protruded toward other barriers so that they overlap each other in the direction of the photographing optical axis OA.

The both side compartment wall portions 671A of the first barrier 521 and both side compartment wall portions 674A of the fourth barrier 524 are arranged parallel in the radial direction as shown in FIG. 11A, and the stepped portions 731A and 734A are arranged parallel in the direction of the photographing optical axis OA in such a manner as disposing the stepped portion 731A at a front side. Consequently, the stepped portions 731A and 734A are protruded toward other barriers such that they are overlapped with each other in the direction of the photographing optical axis OA.

Moreover, the both side compartment wall portions 672A of the second barrier 521 and both side compartment wall portions 673A of the third barrier 523 are arranged parallel in the radial direction as shown in FIG. 11B, and the stepped portions 732A and 733A are arranged parallel in the direction of the photographing optical axis OA in such a manner as disposing the stepped portion 732A at a front side. Consequently, the stepped portions 732A and 733A are protruded toward other barriers 52 such that they are overlapped with each other in the direction of the photographing optical axis OA.

Furthermore, the both side compartment wall portions 672A of the second barrier 522 and both side compartment wall portions 674A of the fourth barrier 524 are arranged parallel in the radial direction as shown in FIG. 11C, and the stepped portions 732A and 734A are arranged parallel in the direction of the photographing optical axis OA in such a manner as disposing the stepped portion 732A at a front side. Consequently, the stepped portions 732A and 734A are protruded toward other barriers 52 such that they are overlapped with each other in the direction of the photographing optical axis OA.

Simultaneously, when the four barriers 52 are closed, the inner side compartment wall portion 671B of the first barrier 521 and the inner compartment wall portions 672B of the second barrier 522 are arranged parallel in the radial direction as shown in FIG. 11D, and the stepped portions 731B and 732B are arranged parallel in the direction of the photographing optical axis OA in such a manner as disposing the stepped portion 731B at a front side. Consequently, the stepped portions 731B and 732B are protruded toward other barriers 52 such that they are overlapped with each other in the direction of the photographing optical axis OA.

In addition, in the first barrier 521, the second barrier 522, the third barrier 523, and the fourth barrier 524, the protruded amount of the cam protrusion 68 in each of the barriers is set as follows.

Figure 12:
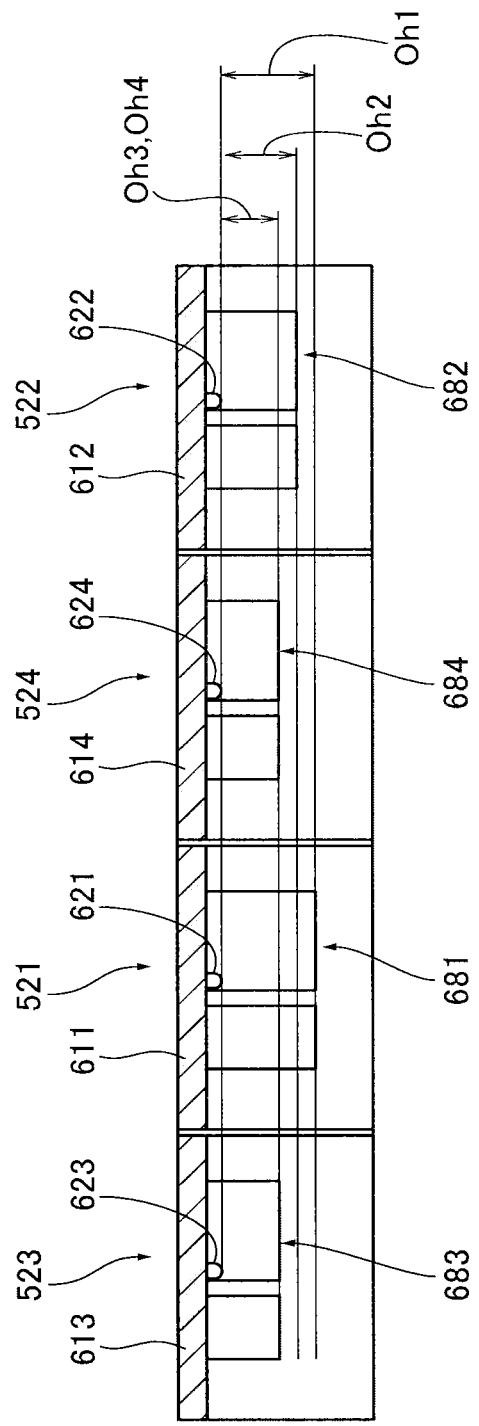
FIG. 12 is an explanatory view to explain a difference among protruded amounts of cam protrusions provided on the barriers.

As shown in FIG. 12, if the protruded amount of the cam protrusion 681 of the first barrier 521 is Oh1, the protruded amount of the cam protrusion 682 of the second barrier 522 is Oh2, the protruded amount of the cam protrusion 683 of the third barrier 523 is Oh3, and the protruded amount of the cam protrusion 684 of the fourth barrier 524 is Oh4, Oh1 is the maximum, Oh2 is smaller than Oh1, Oh3 and Oh4 are smaller than Oh2, and Oh3 and Oh4 are equal. In other words, the protruded amount Oh1 of the cam protrusion 681 provided on the first barrier 521 having the stepped portion 73 overlapping at the object side with the adjacent compartment wall portion 67 is set to have the largest value. The protruded amount Oh2 of the cam protrusion 682 provided on the second barrier 522 having the stepper portion 73 which overlaps at the object side with the adjacent compartment wall portion 67 and has the number lesser by one than that of the first barrier 521 is set to be smaller than Oh1. Further, the protruded amount Oh3 of the cam protrusion 683 provided on the third barrier 523 having the stepped portion 73 which overlaps at the object side with the adjacent compartment wall portion 67 and has the number lesser by two than that of the second barrier 522, and the protruded amount Oh4 of the cam protrusion 684 provided on the fourth barrier 524 having the stepped portion 73 which overlaps at the object side with the adjacent compartment wall portion 67 and has the number lesser by two than that of the second barrier 522 are set to be smaller than Oh2.

Next, an assembly of the lens cap unit 50 is described. Each of the four barriers 52 is disposed on each of the four supporting mechanisms 53 provided on the mounting part 51 (see FIG. 7). At this time, the four barriers, that is to say, first barrier 521, the second barrier 522, the third barrier 523, and the fourth barrier 534 are placed in a positional relationship as shown in FIGS. 6 and 7. As shown in FIG. 7, the torsion spring 74 is disposed in the attaching portion 66 of each barrier 52 (see arrow A1), and the one end 74a thereof is inserted in the cut groove 71b of the outer edge portion 71a of the receiving concave portion 71 of the attaching portion 66 (see FIG. 17B). The attaching portion 66 in which the torsion spring 74 is assembled is disposed in the receiving concave portion 54 between the pair of bearing protrusion portions 55 of the corresponding supporting mechanism 53 (see arrow A2). At this time, the one end 74a of the torsion spring 74 passing through the cut groove 71b of the outer edge portion 71a of the receiving concave portion 71 is inserted in the fixing hole 54b provided in the receiving concave portion 54 of the supporting mechanism 53 (see FIG. 17B).

Thereafter, the shaft 56 is inserted in the shaft inserting holes 55a and the through-hole 72a from one of the bearing protrusion portions 55 (see arrow A3), as mentioned above. Thereby, each barrier 52 is rotatably supported about the shaft 56 by each of the four supporting mechanisms 53 of the mounting part 51. Therefore, the shaft 56 constitutes an opening and closing axis which is perpendicular to the photographing optical axis OA and is a rotation center of each barrier 52 relative to the mounting part 51, in cooperation with the bearing portions 72 of each barrier 52 and the bearing protrusion portions 55 of the mounting part 51.

In the following description, a direction rotating each barrier 52 about the shaft 56 to place the barrier in the closed state (FIG. 5A) where each barrier closes one of the opening portions of the mounting part 51 is referred to as a closing direction, and a direction rotating each barrier 52 about the shaft 56 to place the barrier in the opened state where each barrier opens one of the opening portions of the mounting part 51 is referred to as an opening direction. In addition, a state where each barrier 52 is rotated into a maximum rotation position is referred to as a maximum opening state (see FIGS. 16 and 17). The maximum opening state is set by adjusting adequately an engaging position of the outer edge portion 54a of the receiving concave portion 54, and an outer side surface of the outer wall portion 65 close to the attaching portion 66 of each barrier 52 or outer side surface of the outer edge portion 71a of the receiving portion 71 in the attaching portion 66 (see FIG. 13). In the embodiment, the maximum opening state is set from a viewpoint that a lens hood 78 including a hood body 78a, which is attached to the leading end portion of the movable lens cylinder 40 can be housed in the opened barriers (see FIGS. 16 and 17). The cut groove 71b provided in the outer edge portion 71a of the receiving portion 71 of each barrier 52 has a size to be capable of receiving the one end 74a of the torsion spring 74 at the time of the maximum opening state (see FIG. 17B).

Thereafter, the other end 74b of the torsion spring 74 is passed through the divided groove 68a and passed between the rib protrusion portion 62 and the first auxiliary protrusion 63 along the planar portion 61. A folded portion 74c provided on the leading end portion of the other end of the torsion spring 74 is passed through the through-hole 62a of the rib protrusion portion 62 and is fixed to the second auxiliary protrusion 64 (see FIG. 9B). The torsion spring 74 is formed to generate a force resisting when taking the one end 74a far away from the other end 74b in the closed state of the barriers 52. In addition, a generated force of the torsion spring 74 is set to be smaller than a force when the movable lens cylinder 40 is moved relatively to the fixed cylinder 37 (exterior 32) in the direction of the photographing optical axis OA. The one end 74a of the torsion spring 74 is connected to the mounting part 51 and the other end 74b of the torsion spring is connected to each barrier 52. Consequently, the torsion spring 74 gives a pressing force to each barrier 52 to bias the barrier in a closing direction. Thereby, the lens cap unit 50 is assembled.

In the lens cap unit 50 structured as mentioned above, when each barrier 52 is closed, because the outer wall portion 65 can be fitted in the inner edge cut 57 of the mounting part 51, each barrier 52 is prevented from being further rotated in the closing direction from the closed state (see FIG. 10). Each barrier 52 is fixed in the closed state because the rotation of the barrier is restricted in the closed state by an engagement operation of the outer wall portion 65 of each barrier 52 and the inner edge cut 57 of the mounting part 51, although the pressing force to rotate the barrier is imparted to the barrier by the torsion spring 74. When a force in the opening direction to open each barrier 52 is imparted to the barrier 52, the barrier 52 is rotated about the shaft 56 in the opening direction to open the barrier against the biasing force of the torsion spring 74. A rotatable range of the barrier 52 into the opening direction is until the barrier reaches the maximum opening state by the engagement of the outer edge portion 54a of the receiving concave portion 54 and the outer side surface of the of the outer edge portion 71a, or outer side surface of the bearing portion 71 (see FIGS. 16 and 17).

Next, the mounting of the lens cap unit 50 on the lens barrel 13 of the digital camera 10 is described. In the digital camera 10, as shown in FIG. 4, the ring cap 36 mounted on the lens barrel side-connecting portion 38 of the fixed cylinder 37 of the lens barrel 13 is first removed from the fixed cylinder 37 by rotating the ring cap 36 about the photographing optical axis OA relative to the fixed cylinder 37, in the state where the movable lens cylinder 40 (linearly-moving cylinder 41) is collapsed (see FIG. 1A). Thereafter, the lens cap unit 50 is moved from the object side toward the fixed cylinder 37 along the photographing optical axis OA, and the pawl portion 51b of each of the cap side-connecting portions 51a is fitted in the opened portion 38d of each of the connection portions 38b of the fixed cylinder 37. Thereafter, the lens barrel 13 and the lens cap unit 50 are relatively rotated to allow the pawl portion 51b to engage with the pawl portion 38c to connect the cap side-connecting portion 51a to the lens barrel side-connecting portion 38. Thereby, the lens cap unit 50 is mounted on the lens barrel 13 (fixed cylinder 37) adequately (see FIG. 5).

Figure 1A:
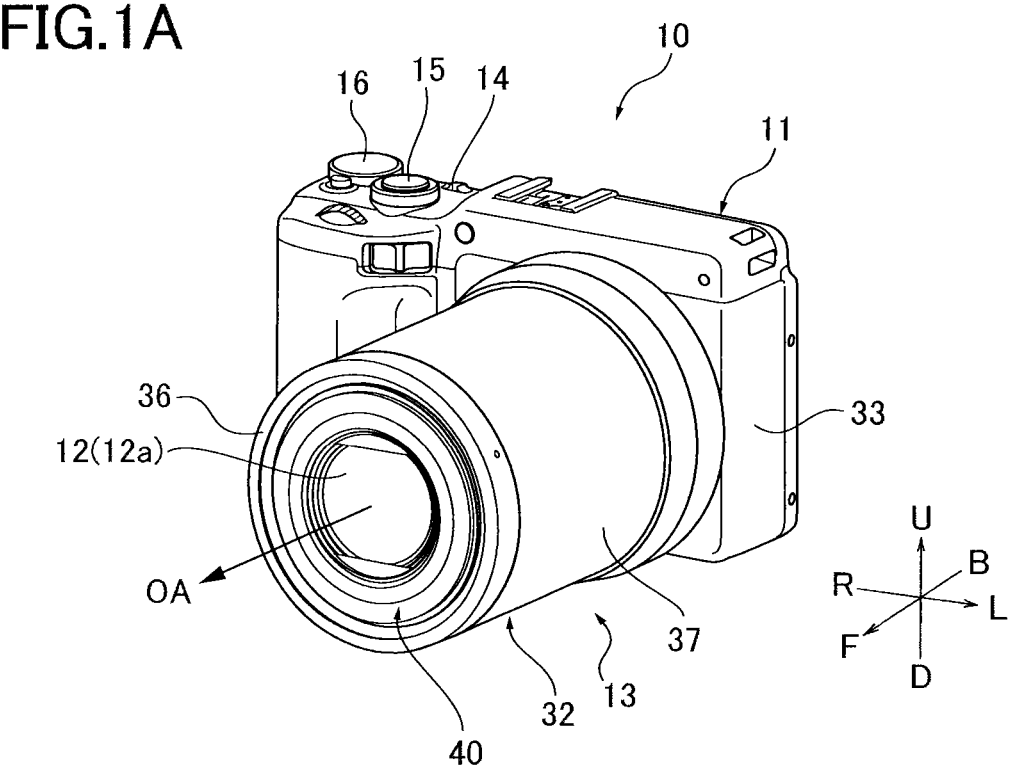
FIG. 1A is a perspective view showing schematically a digital camera as one example to which a lens cap unit according to an embodiment of the present invention is to be applied, with a movable lens cylinder of a lens barrel being in a collapsed position.
Figure 1B:
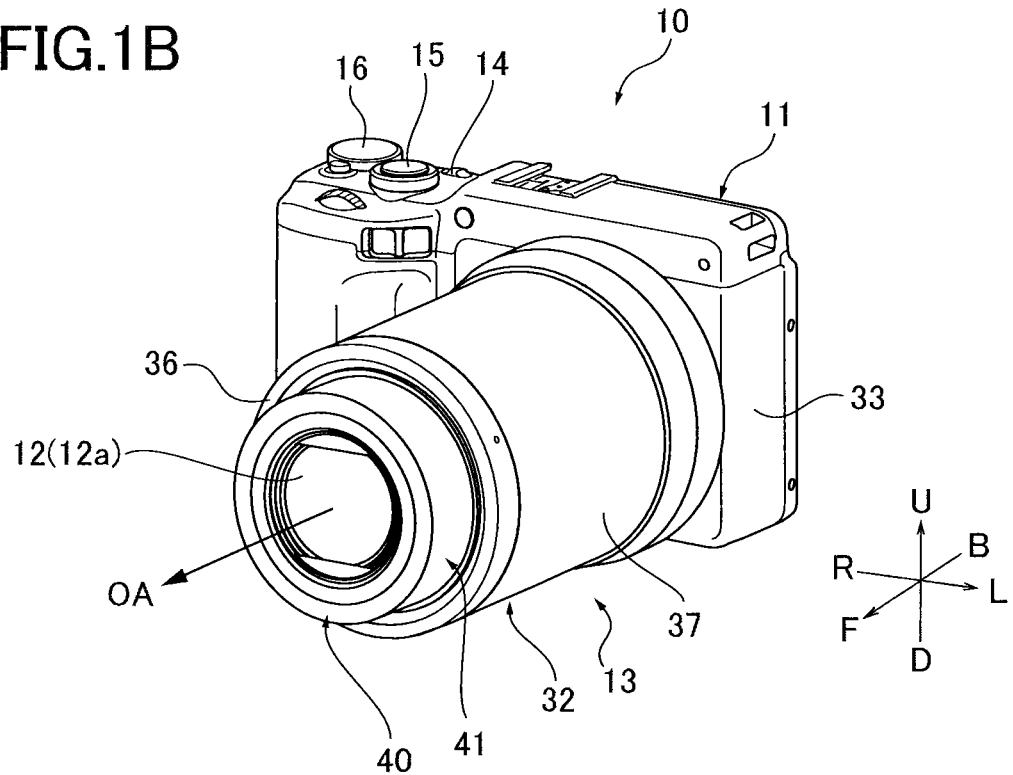
FIG. 1B is a perspective view showing schematically the digital camera, with the movable lens cylinder being in an extended position.

At this time, the mounting part 51 is mounted on the lens barrel side-connecting portion 38 of the fixed cylinder 37 in the state where the lens barrel 13 is collapsed (see FIG. 1A). In the state, the four barriers 52 are in a closed state (see FIG. 5A and FIG. 14A). That is to say, the barriers can cover the front portion of the object side of the lens barrel 13 including the movable lens cylinder 40 and the effective diameter of the photographing optical system 12, and the first lens group 12a (objective lens) (see FIG. 5A and FIG. 14A). In this case, in the adjacent barriers in which they are in the closed state, because the stepped portion 73 provided on each compartment wall portion 67 of one barrier is disposed to be overlapped the stepped portion of the other barrier 52, it is possible to eliminate a clearance between the adjacent barriers (see FIGS. 10 and 11). In this closed state, the cam protrusion 68 of each barrier 52 is disposed to face the leading end surface 41c of the linearly-moving cylinder 41 in the front portion of the movable lens cylinder 40 in the direction of the photographing optical axis OA (see FIG. 14A).

Figure 14B:
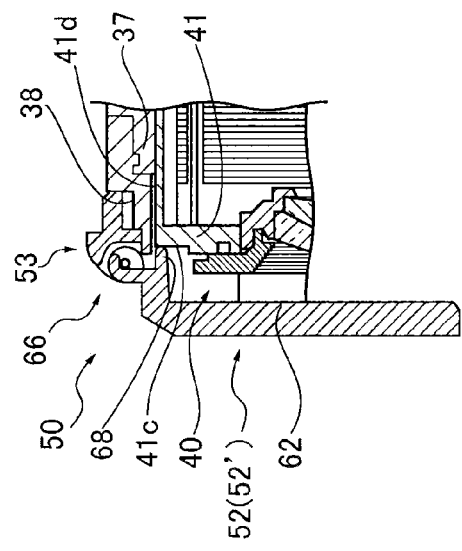
Figure 14D:
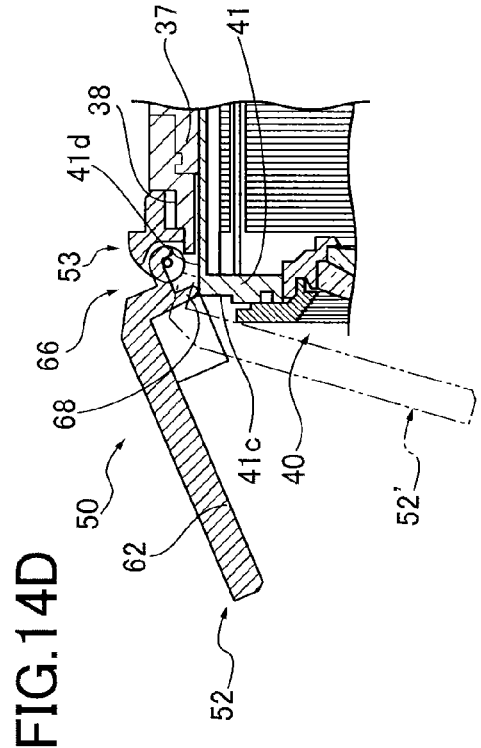
Figure 14A:
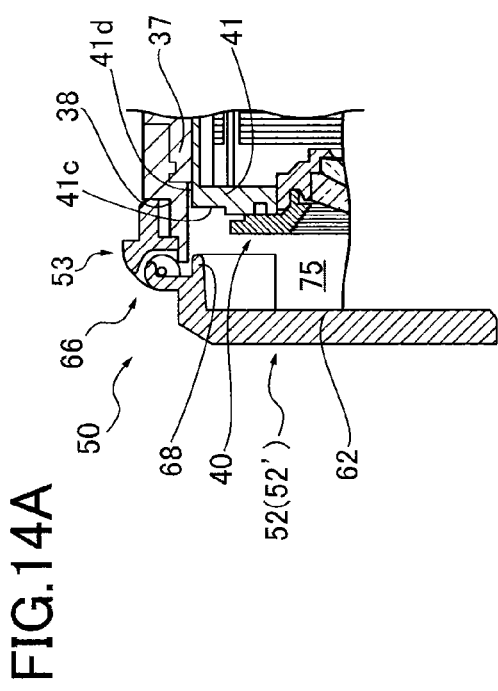

As shown in FIGS. 13 and 14A, the lens cap unit 50 in the embodiment is set to have a size capable of forming a containing space 75 between the leading end surface of the lens barrel 13 (movable lens cylinder 40 and the effective diameter of the photographing optical system 12 (first lens group 12a (objective lens)) disposed in the collapsed state (see FIG. 1A), and the back surface of each barrier 52 (protruded end surface of the rib protrusion portion 68). A size of the containing space 75 is set as flows.

As mentioned above, the annular mounting member 76 can be mounted on the leading end portion of the movable lens cylinder 40 (see FIG. 13). As mentioned above, because optical members and so on can be detachably attached to the annular mounting member 76, an optical filter 77 as the optical member can be mounted on the annular mounting member 76, as shown in FIG. 13. The optical filter 77 includes a filter portion 77a adjusting incident light entering the photographing optical system 12 of the movable lens cylinder 40 and an annular supporting frame portion 77b surrounding the filter portion 77a. The supporting frame portion 77b has an outer circumferential surface provided with a threaded portion 77c in which a threaded portion 76b provided on an inner circumferential surface of the annular mounting member 76 is engaged. Consequently, the optical filter 77 can be mounted on the annular mounting member 76 attached to the leading end portion of the movable lens cylinder 40 by engaging the threaded portion 77c of the supporting frame portion 77b with the threaded portion 76b of the annular mounting member 76. The foregoing containing space 75 has a size capable of receiving the annular mounting member 76 which is attached to the leading end portion of the movable lens cylinder 40 and to which the optical filter 77 is attached. That is to say, in the lens cap unit, each barrier 52 can be closed in the state where the annular mounting member 76 and the optical filter 77 are mounted on the leading end portion of the movable lens cylinder 40 (see FIG. 13).

Next, an operation of the lens cap unit 50, that is to say, a state where barriers 52 are opened and closed, depending on a position of the movable lend cylinder 40 relative to the fixed cylinder 37 (exterior 32) is described with reference to FIGS. 14 and 15. In a description of the operation, the annular mounting member 76 and the optical filter 77 (FIG. 13) are not mounted on the leading end portion of the movable lens cylinder 40. In addition, because a rotational operation of each barrier 52 is basically equal in spite of a difference of the protruded amount of the cam protrusion 68 of each barrier, a basic operation of each barrier is first described with reference to FIGS. 14 and 15, and a difference of operation by the difference of the protruded amount is described thereafter.

Figure 14C:
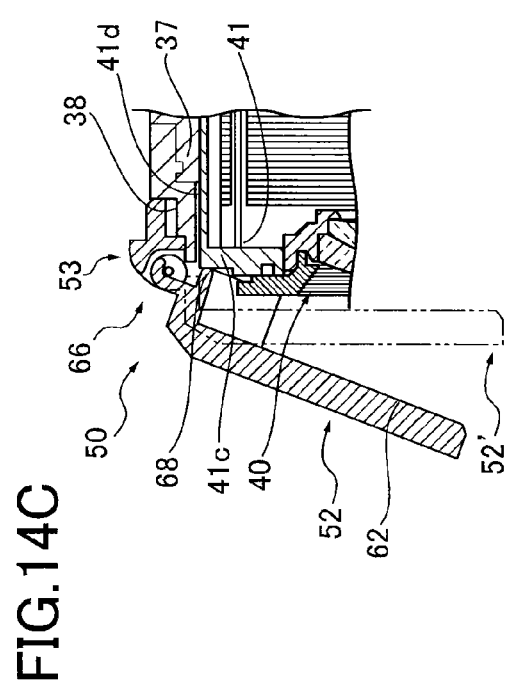

When the movable lens cylinder 40 (linearly-moving cylinder 41) is in the collapsed state (see FIG. 1A), as shown in FIG. 14A, each barrier 52 and the movable lens cylinder 40 are separated by a distance of the containing space 75. Thereafter, when the movable lens cylinder 40 is extended from the fixed cylinder 37, as shown in FIG. 14B, the leading end portion of the movable lens cylinder 40, in other words, the leading end surface 41c of the linearly-moving cylinder 41 is in contact with the cam protrusion 68 of each barrier 52. When the movable lens cylinder 40 is further extended from the fixed cylinder 37, as shown in FIG. 14C, the leading end surface 41c of the movable lens cylinder 40 presses the cam protrusion 68 of each barrier 52 toward the object side along the photographing optical axis OA, thereby each barrier 52 is rotated in the opening direction about the shaft 56 provided on the supporting mechanism 53 against the torsion spring 74.

When the movable lens cylinder 40 is further extended from the fixed cylinder 37, as shown in FIG. 14D, the cam protrusion 68 of each barrier 52 moves over the circumferential edge portion of the leading end surface 41c of the linearly-moving cylinder 41 of the movable lens cylinder 40 and is in contact with the outer circumferential surface 41d of the linearly-moving cylinder 41. In the embodiment, each barrier 52 is, in this state, adequately opened (see FIG. 5B). A state where each barrier is adequately opened, that is to say, the adequate opening state means a state where the barrier is disposed outside an angular field of the photographing optical system 12 supported on the movable lens cylinder 40 (a state where the angular field is not covered). In other words, in the adequate opening state, each barrier does not cover the angular field of the lens barrel, specifically, the movable lens cylinder 40. An opening degree of this adequate opening state is set to be smaller than that of the foregoing maximum opening state (see FIGS. 16 and 17) of each barrier 52. Therefore, each barrier 52 can be rotated further in the opening direction from the adequate opening state. At the time of the adequate opening state, any portions of each barrier 52 including mainly the rib protrusion portion 62 and so on, except the cam protrusion 68 does not contact with the movable lens cylinder 40 (the leading end surface 41c and the outer circumferential surface 41d).

In the embodiment, when the linearly-moving cylinder 41 of the movable lens cylinder 40 is extended from the fixed cylinder 37 to a wide angle position, a position and a size of each of the shaft 56 and the cam protrusion 68 relative to the linearly-moving cylinder 41 (the leading end surface 41c and the outer circumferential surface 41d) are set so that each barrel 52 is in the adequate opening state. Moreover, in the embodiment, because the protruded amount of the cam protrusion 68 of each barrier differs from that of the other barriers, as mentioned above, the barrier 523 and the fourth barrier 524 initiate to rotate in the opening direction, at the end, in accordance with the difference of the protruded amount. Therefore, the barrier 523 and the fourth barrier 524 are in the adequate opening state at the end. Consequently, the lens cap unit 50 is, when the linearly-moving cylinder 41 of the movable lens cylinder 40 is extended from the fixed cylinder 37 to the wide angle position, configured to place the barrier 523 and the fourth barrier 524 in the adequate opening state.

As mentioned above, the movable lens cylinder 40 can be extended further from the fixed cylinder 37, from the wide angle position to a telephoto position (see FIG. 15). Here, as shown in FIGS. 15A and 15B, from the adequate opening state of the barrier (see FIGS. 14D and 15A), even if the movable lens cylinder 40 is extended further from the fixed cylinder 37, a contacting position of the cam protrusion 68 of the barrier 52 and the outer circumferential surface 41c of the linearly-moving cylinder 41 merely changes, the adequate opening state of each barrier 52 is maintained. Thereafter, when the movable lens cylinder 40 is extended further from the fixed cylinder 37, as shown in FIG. 15B, the leading end surface 41c of the linearly-moving cylinder 41 of the movable lens cylinder 40 is in contact with the rib protrusion portion 62 of each barrier 52. When the movable lens cylinder 40 is extended further from the fixed cylinder 37, as shown in FIG. 15C, the leading end surface 41c of the linearly-moving cylinder 41 of the movable lens cylinder 40 presses the rib protrusion portion 62 of each barrier 52 toward the object side along the photographing optical axis OA. Thereby, each barrier 52 is rotated in the opening direction about the shaft 56 provided on the supporting mechanism 53 of the mounting part 51 against the torsion spring 74. At this time, the leading end surface 41c of the linearly-moving cylinder 41 of the movable lens cylinder 40 presses the rib protrusion portion 62 of each barrier 52 while changing a radial contacting position of the leading end surface with the rib protrusion portion 62 as the barrier opens. When the movable lens cylinder 40 is extended further from the fixed cylinder 37, as shown in FIG. 15D, the rib protrusion portion 62 of each barrier 52 is moved over the circumferential edge portion of the leading end surface 41c of the linearly-moving cylinder 41 of the movable lens cylinder 40 and is in contact with the outer circumferential surface 41d of linearly-moving cylinder 41. Thereby, the lens barrel 13 is in the telephoto position. In the embodiment, even in this state, an opening degree of each barrier is smaller than that of the maximum opening state (see FIGS. 16 and 17). In other words, each barrier 52 can be opened further to the maximum opening state.

Consequently, when the movable lens cylinder 40 is extended from the fixed cylinder 37, each barrier 52 is in the adequate opening state, and is not rotated in the closing direction from the adequate opening state. In addition, because each barrier 52 can be rotated further in the opening direction from the adequate opening state, the movement of the movable lens cylinder 40 (linearly-moving cylinder 41) from the wide angle position to the telephoto position is not blocked.

In the lens cap unit 50, if the movable lens cylinder 40 is in the collapsed position (see FIG. 14A) through movement from the telephoto position (see FIG. 15D) to the wide angle position (see FIG. 15A or FIG. 14D), because each barrier 52 is subjected to a pressing force closing the barrier from the torsion spring 74, an operation opposite to the foregoing operation is performed. That is to say, each barrier 52 is moved from a state (see FIG. 15D) opened more than the adequate opening state through the adequate opening state (see FIG. 15A or FIG. 14D) to the closed state (see FIG. 14A). Therefore, in the lens cap unit 50, it is possible to perform an automatic opening and closing of each barrier 52 in accordance with the extending operation and the collapsing operation of the movable lens cylinder 40 (linearly-moving cylinder 41) from the fixing cylinder 37 without blocking the movement of the movable lens cylinder 40 along the photographing optical axis OA.

Meanwhile, if the annular mounting member 76 and the optical filter 77 are mounted on the leading end portion of the movable lend cylinder 40 (see FIG. 13), it is considered that, depending on a position of the optical filter 77 in the direction of the photographing optical axis, the rib protrusion portion 62 and the optical filter 77 may be in contact prior to the cam protrusion 68 and the leading end surface 41c of the linearly-moving cylinder 41 of the movable lens cylinder 40 are in contact. However, even in this case, when the movable lens cylinder 40 is further extended from the fixed cylinder 37 thereafter, the cam protrusion 68 and the leading end surface 41c of the linearly-moving cylinder 41 of the movable lens cylinder 40 are in contact, and each barrier is in the adequate opening state by the contacting operation of the cam protrusion 68 and the leading end surface 41c. Consequently, it is possible to acquire the same operation as the state where the annular mounting member 76 and the optical filter 77 are not mounted on the leading end portion of the movable lend cylinder 40.

Figure 11:
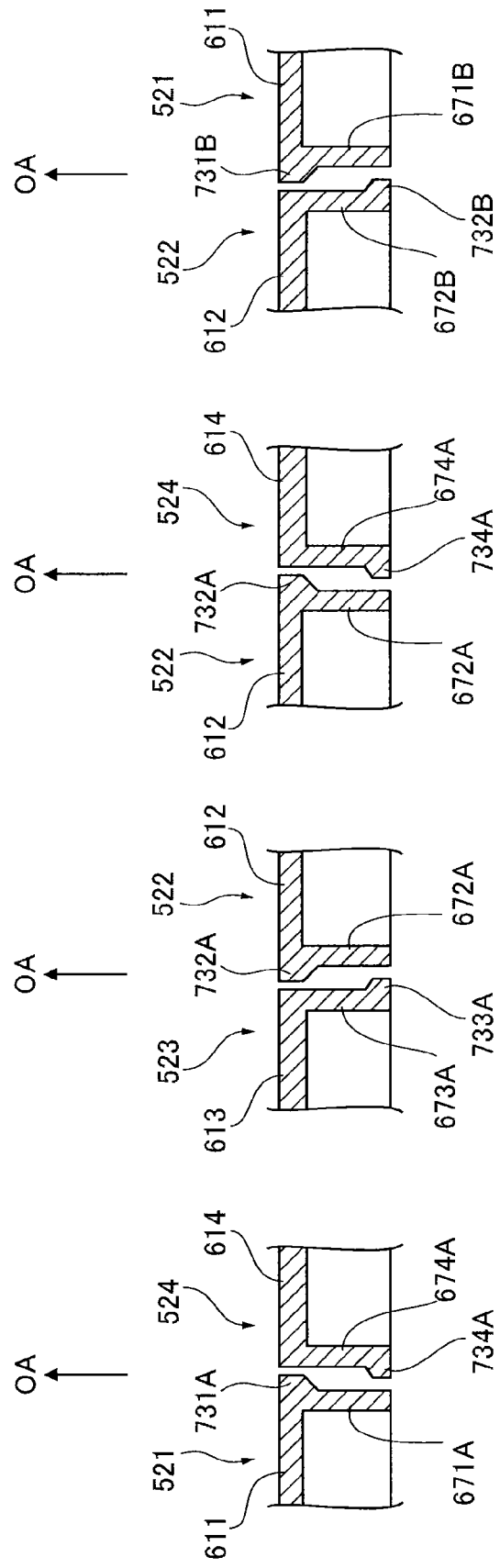

In the lens cap unit 50, as mentioned above, the protruded amount of the cam protrusion 68 from the back surface of each barrier 52 is set to be different from that of the other cam protrusions. That is to say, the following relationship is set:

The protruded amount Oh1 (cam protrusion 681)>the protruded amount Oh2 (cam protrusion 682)>the protruded amount Oh3 (cam protrusion 683)=the protruded amount Oh4 (cam protrusion 684) (see FIG. 11). Consequently, the following operation is performed.

When the movable lens cylinder 40 (linearly-moving cylinder 41) is moved from the collapsed position (see FIG. 1A) to the wide angle position, the longest cam protrusion 681 is in contact with the leading end surface 41c of the linearly-moving cylinder 41 of the movable lens cylinder 40. Thereafter, when the movable lens cylinder 40 is extended further from the fixed cylinder 37, the first barrier 521 on which the cam protrusion 681 is provided is rotated in the opening direction. At this time, as mentioned above, because the stepped portion 731B of the inner compartment wall portion 671B of the first barrier 521 is disposed forward (opening direction side) more than the stepped portion 732B of the inner compartment wall portion 672B of the second barrier 522 (see FIG. 11D) and the stepped portion 731A of each of the side compartment wall portions 671A of the first barrier 521 is disposed forward more than the stepped portion 733A of each of the side compartment wall portions 673A of the third barrier 523 and the stepped portion 734A of each of the side compartment wall portions 674A of the fourth barrier 524 (see FIG. 10 and FIG. 11A), each stepped portion 73 (731A, 731B) does not block the rotation of the first barrier 521 in the opening direction.

Thereafter, when the movable lens cylinder 40 is extended further from the fixed cylinder 37, the cam protrusion 682 (see FIG. 11) having a next length of the longest cam protrusion 681 is in contact with the leading end surface 41c of the linearly-moving cylinder 41 of the movable lens cylinder 40. Thereafter, when the movable lens cylinder 40 is extended further from the fixed cylinder 37, the second barrier 522 provided with the cam protrusion 682 is rotated in the opening direction. At this time, because the stepped portion 732A of each of the side compartment wall portions 672A of the second barrier 522 is disposed forward more than the stepped portion 733A of each of the side compartment wall portions 673A of the third barrier 523 and the stepped portion 734A of each of the side compartment wall portions 674A of the fourth barrier 524 (see FIG. 11B and FIG. 11C), and the stepped portion 731B of the inner compartment wall portion 671B of the first barrier 521 disposed forward (opening direction side) more than the stepped portion 732B of the inner compartment wall portion 672B of the second barrier 522 has been moved, each stepped portion 73 (732A, 732B) does not block the rotation of the second barrier 522 in the opening direction.

Thereafter, when the movable lens cylinder 40 is extended further from the fixed cylinder 37, the shortest cam protrusions 683 and 684 (see FIG. 11) having a next length of the cam protrusion 682 are in contact with the leading end surface 41c of the linearly-moving cylinder 41 of the movable lens cylinder 40. Thereafter, when the movable lens cylinder 40 is extended further from the fixed cylinder 37, the third barrier 523 provided with the cam protrusion 683 and the fourth barrier provided with the cam protrusion 684 are rotated in the opening direction. At this time, because the stepped portion 731A of each of the side compartment wall portions 671A of the first barrier 521 and the stepped portion 732A of each of the side compartment wall portions 672A of the second barrier 522 disposed forwarded more than the stepped portion 733A of each of the side compartment wall portions 673A of the third barrier 523 and the stepped portion 734B of each of the side compartment wall portions 674B of the fourth barrier 524 have been moved, each stepped portion 73 (733) and each stepped portion 73 (734A) do not block the rotation of the third barrier 523 and the fourth barrier 524 in the opening direction.

In the lens cap unit 50, when the movable lens cylinder 40 is moved from the telephoto position (see FIG. 15D) through the wide angle position (see FIG. 15A or FIG. 14D) to the collapsed position (see FIG. 14A), because an operation opposite to the foregoing operation is performed, the third barrier 523 and the fourth barrier 524 are first in the closed state, and then the second barrier 522 is closed, and finally the first barrier 521 is in the closed state. At this time, because each stepped portion 73 of each barrier 52 is in the positional relationship (see FIGS. 10 and 11), as mentioned above, the rotation of each barrier 52 is not blocked.

In this way, in the lens cap unit 50, the first barrier 521, the second barrier 522, the third barrier 523, and the fourth barrier 524 are in the adequate opening state in order from the first barrier to the fourth barrier, depending on the extension of the movable lens cylinder 40 from the fixed cylinder 37. In addition, these barriers are in the closed state in order of the third barrier 523 and the fourth barrier 524, the second barrier 522, and the first barrier 521, depending on the collapse or containing of the movable lens cylinder 40 in the fixed cylinder 37. Consequently, each barrier 52 can automatically be opened and closed depending on the extension of the movable lens cylinder 40 from the fixed cylinder 37 and the collapse of the movable lens cylinder 40 in the fixed cylinder 37, without blocking the movement of the movable lens cylinder 40 along the photographing optical axis OA. Here, in cases of initiating the rotation from the closing state to the opening state and completing the rotation in the closing direction to the closing state, because it is sufficient to prevent the interference of each stepped portion 73, before the previously rotated barrier 52 in the opening direction is in the adequate opening state, it is preferable to initiate the rotation of the next barrier 52 in the opening direction (mainly, by setting the protruded amount of the cam protrusion 68).

In addition, in the state where the lens cap unit 50 is mounted on the fixed cylinder 37, it is possible to attach the lens hood 78 (see FIGS. 16 and 17) to the leading end portion of the movable lend cylinder 40. This is described as follows.

Figure 17B:
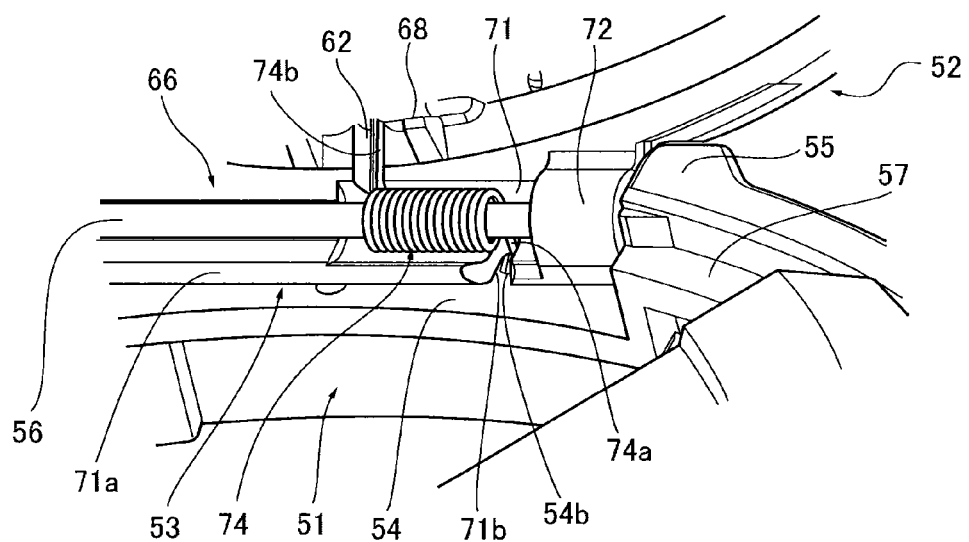

The lens hood 78 includes a hood body 78a and a hood side-mounting portion 78b, as shown in FIGS. 16 and 17. The hood body 78a has a cylindrical shape which has an inner diameter gradually enlarging as going to the object side and includes a hood portion to block light. The hood side-mounting portion 78b is used to attach the lens hood 78 (hood body 78a) to the annular mounting member 76 (see FIG. 13) mounted on the movable lens cylinder 40, although it is not clearly shown in the drawings. To attach the hood side-mounting portion 78b to the annular mounting member 76, the mounting threaded groove 76b (see FIG. 13) of the annular mounting member 76, or a bayonet-type mounting mechanism similar to the pawl portion 38c (see FIG. 4) and the pawl portion 51b (see FIG. 7), provided between the hood side-mounting portion 78b and the annular mounting member 76 may be used, similarly to the optical filter 77 (see FIG. 13). In the lens hood 78, the hood body 78a has a diameter larger than that of the movable lens cylinder 40 (linearly-moving cylinder 41) to extent a function as mentioned below. The lens cap unit 50 is set so that the barriers 52 of the maximum opening state can be received in the hood body 78a of the lens hood 78 provided on the leading end portion of the movable lens cylinder 40. The setting of the maximum opening state can be performed by adjusting adequately a position where the outer edge portion 54a of the receiving concave portion 54 of the mounting part 51, the outer side surface of the outer wall portion 65 of each barrier 52, or outer side surface of the outer edge portion 71a of the receiving portion 71 are engaged, as mentioned above. At this time, as mentioned above, the one end 74a of the torsion spring 74 is received in the cut groove 71b provided in the outer edge portion 71a of each barrier 52, thereby the interference (engagement) of the one end 74a and the outer edge portion 71a is prevented (see FIG. 17B). Consequently, even if the lens cap unit 50 is mounted on the fixed cylinder 37, the lens hood 78 can be attached to the leading end portion of the movable lens cylinder 40 by rotating the barriers 52 to the maximum opening state.

In the lens cap unit 50, the cam protrusion 68 which is disposed inside the outer circumferential position of the leading end portion of the movable lens cylinder 40 and outside the effective diameter of the photographing optical system 12 (first lens group 12 (objective lens)), in the radial direction, and is protruded from the back surface of each barrier is provided on each barrier 52. Accordingly, even if the extension amount of the movable lens cylinder 40 from the fixed cylinder 37 is set to a small value, it is possible to place each barrier in the adequate opening state which is completely opened. This is for the following reason.

Each barrier 52' to which the cam protrusion 68 is not provided is shown by two-dotted line in FIG. 14. In the barrier 52', the leading end surface 41c (circumferential edge portion) of the linearly-moving cylinder 41 of the movable lens cylinder 40 is in contact with the back surface (rib protrusion portion 62) of the barrier 52', by use of the movement of the movable lens cylinder 37 relative to the fixed cylinder 37, the barrier 52' is rotated in the opening direction (see FIGS. 14C and 14D). Consequently, the barrier 52' is not in the adequate opening state even if the linearly-moving cylinder 41 of the movable lens cylinder 40 is extended from the fixed cylinder to the wide angle position (see FIG. 14D), and hence the barrier is disposed inside the angular field of the photographing optical system 12. Consequently, the incident light entering the photographing optical system 12 is blocked by the barrier. On the contrary, in the lens cap unit 50, because the cam protrusion 68 protruded from the back surface of each barrier is disposed inside the outer circumferential position of the leading end portion of the movable lens cylinder 40 and outside the effective diameter of the photographing optical system 12 (first lens group 12 (objective lens)), in the radial direction, when the linearly-moving cylinder 41 of the movable lens cylinder 40 is extended from the fixed cylinder 37 to the wide angle position, each barrier can be securely opened into the adequate opening state (see FIG. 14D).

In addition, in the lens cap unit 50, because the cam protrusion 68 which is disposed inside the outer circumferential position of the leading end portion of the movable lens cylinder 40 and outside the effective diameter of the photographing optical system 12 (first lens group 12 (objective lens)), in the radial direction, and is protruded from the back surface of each barrier is provided on each barrier 52, when the movable lens cylinder 40 (linearly-moving cylinder 41) is extended from the fixed cylinder 37, the cam protrusion 68 is in contact with the leading end surface 41c of the linearly-moving cylinder 41. In this case, until the each barrier is in the adequate opening state after the cam protrusion 68 has been in contact with the leading end surface 41c of the linearly-moving cylinder 41, any portions including the back surface of the barrier 52 except the cam protrusion 68 are not in contact with the movable lens cylinder 40 or the linearly-moving cylinder 41. Consequently, each barrier 52 is rotated about the shaft 56 in the opening direction by pressing the barrier by the movable lens cylinder 40 or the leading end surface 41c of the linearly-moving cylinder 41, thereby each barrier can be placed in the adequate opening state securely.

Moreover, in the lens cap unit 50, because the cam protrusion 68 is in contact with the outer circumferential surface 41d of the linearly-moving cylinder 41 of the movable lens cylinder 40 to place each barrier 52 in the adequate opening state, even if the movable lens cylinder 40 (linearly-moving cylinder 41) is extended further from the fixed cylinder 37, each barrier 52 is prevented from being rotated from the adequate opening state into the closing direction. Therefore, if the extension amount of the movable lens cylinder 40 from the fixed cylinder 37 is set to be larger than the wide angle position of the movable lens cylinder 40 (linearly-moving cylinder 41), each barrier can securely be opened to the adequate opening state.

In the lens cap unit 50, because it is permitted that each barrier 52 can be rotated further in the opening direction from the adequate opening state, even if the extension amount of the movable lens cylinder 40 (linearly-moving cylinder 41) from the fixed cylinder 37 increases, and the leading end surface 41c (circumferential edge portion) of the linearly-moving cylinder 41 of the movable lens cylinder 40 is in contact with the back surface (rib protrusion portion 62) of each barrier 52, it is possible to prevent from blocking further extension of the movable lens cylinder 40 from the fixed cylinder 37. Therefore, if a lens barrel in which the extension amount of the movable lens cylinder 40 (linearly-moving cylinder 41) from the fixed cylinder 37 is larger than the wide angle position is provided, each barrier can securely be opened to the adequate opening state.

In the lens cap unit 50, because each barrier 52 is biased into the closing direction by the torsion spring 74, if the movable lens cylinder 40 (linearly-moving cylinder 41) is in the collapsed position (contained state, see FIG. 14A), because each barrier 52 can be closed, the aperture of the mounting part 51 can be closed by each barrier 52. Accordingly, it is possible to perform automatically the opening and closing operation of each barrier 52 in accordance with the extension of the movable lens cylinder 40 (linearly-moving cylinder 41) from the fixed cylinder 37 and the collapse of the movable lens cylinder 40 (linearly-moving cylinder 41) in the fixed cylinder 37. In addition, it is possible to protect the lens barrel 13, in particular, the first lens group 12a (objective lens) of the optical elements of the photographing optical system 12, when the movable lens cylinder 40 (linearly-moving cylinder 41) is in the collapsed position (see FIG. 14A).

In the lens cap unit 50, because the rib protrusion portion 62 is provided on the back surface of the planar surface 61 of each barrier 52, and the rib protrusion portion 62 is formed to extend in the radial direction between a center of the outer edge portion 61a and a center of the inner edge portion 61c, it is possible to be in contact the leading end surface 41c of the linearly-moving cylinder 41 extended over the wide angle position from the fixed cylinder 37 with the rib protrusion portion 62 securely. Thereby, it is possible to rotate each barrier stably.

In the lens cap unit 50, because each barrier is provided on the back surface thereof with the rib protrusion portion 62, each barrier has an increased strength without increasing a weight thereof. Consequently, it is possible to perform smoothly the automatic opening and closing operation depending on the extension of the movable lens cylinder 40 (linearly-moving cylinder 41) from the fixed cylinder 37 and the collapse of the movable lens cylinder 40 (linearly-moving cylinder 41) in the fixed cylinder 37. In addition, it is possible to protect adequately the lens barrel 13, in particular, the first lens group 12a (objective lens) of the optical elements of the photographing optical system 12.

In the lens cap unit 50, because the stepped portions 73 which are disposed between the adjacent compartment wall portions 67 of adjacent barriers 52 and protruded from one barrier to other barrier to overlap each other in the direction of the photographing optical axis OA are provided, when each barrier 52 is closed, it is possible to minimize a clearance among the barriers disposed parallel with and adjacent to each other in a direction perpendicular to the photographing optical axis OA. Thereby, any dust is difficult to be incorporated inside the closed barriers through the clearance, more specifically, within the movable lens cylinder or the linearly-moving cylinder and the fixed cylinder.

In the lens cap unit 50, because the stepped portions 73 which are disposed on the adjacent compartment wall portions 67 of adjacent barriers 52 and protruded from one barrier to other barrier to overlap each other in the direction of the photographing optical axis OA are provided, when looking at the closed barriers 52 from the object side, it is not possible to see the first lens group 12a (objective lens) of the optical elements of the photographing optical system 12 through the clearance among the barriers 52, Thereby, it is possible to provide a camera having a beautiful exterior appearance.

In the lens cap unit 50, because the stepped portions 73 protruding from one barrier to other barrier are overlapped each other in the direction of the photographing optical axis OA, and a clearance between the adjacent compartment wall portions 67 is minimized, the contact of the compartment wall portions 67 (stepped portions) of the adjacent barriers of the closed state (including a close state thereto) is prevented, thereby the rotation of each barrier in the opening direction and the closing direction can be smoothly performed.

In the lens cap unit 50, because the protruded amount of the cam protrusion 68 from the back surface of each barrier is set to be different from that of other barriers, except a part of barriers, each barrier 52 can rotate with a different timing depending on the movement of the movable lens cylinder 40 relative to the fixed cylinder 37.

In the lens cap unit 50, by the different protruded amount of the cam protrusion 68 from the back surface of each barrier, because each barrier 52 can rotate with a different timing depending on the movement of the movable lens cylinder 40 relative to the fixed cylinder 37, it is possible to set easily and securely the sequence of opening the barriers and the timing thereof, the sequence of closing the barriers and the timing thereof.

In the lens cap unit 50, depending on the overlap relation of the stepped portions 73 in the direction of the photographing optical axis OA, because the protruded amount of the cam protrusion in each barrier is set, the rotation of the barriers in the opening direction and the closing direction is prevented from being blocked.

In the lens cap unit 50, by setting the protruded amount of the cam protrusion from the back surface of each barrier 52, the adequate opening state is achieved in order of the first barrier 521, the second barrier 522, the third barrier 523, and the fourth barrier 524, and the closed state is achieved in order of the third barrier 523 and the fourth barrier 524, the second barrier 522, and the first barrier 521. Thereby, it is possible to perform automatically the opening and closing operations of each barrier 52, depending on the extending and collapsing movement of the movable lens cylinder 40 (linearly-moving cylinder 41) relative to the fixed cylinder 37, and provide the stepped portions 73 disposed on the adjacent compartment wall portions 67 of adjacent barriers 52 and protruding from one barrier to other barrier to overlap each other in the direction of the photographing optical axis OA.

In the lens cap unit 50, even if the protruded amount of the cam protrusion 68 from the back surface of each barrier 52 is different, when each barrier 52 is in the adequate opening state, each cam protrusion 68 is in contact with the outer circumferential surface 41d of the linearly-moving cylinder 41 of the movable lens cylinder 40. Therefore, when the linearly-moving cylinder 41 of the movable lens cylinder 40 is extended from the fixed cylinder 37, it is possible to securely place each barrier 52 in the adequate opening state, and prevent securely each barrier from being rotated from the adequate opening state in the closing direction.

In the lens cap unit 50, because the containing space 75 capable of containing the mounting member (optical filter in the embodiment) mounted on the leading end portion of the movable lens cylinder 40 through the annular mounting member 76 is provided between the leading end surface of the lens barrel 13 (movable lens cylinder 40, the effective diameter of the photographing optical system 12 (first lens group 12a (objective lens)) and the back surface (protruded end surface of the rib protrusion portion 62), the lens cap unit 50 can be used for the lens barrel 13 on which the mounting member is mounted. Therefore, a lens cap unit having a high usability can be provided.

In the lens cap unit 50, even if the mounting member is contained in the containing space 75, because the cam protrusion is pressed by the leading end surface 41c of the linearly-moving cylinder 41 of the movable lens cylinder 40 depending on the extending and collapsing movement of the movable lens cylinder 40 relative to the fixed cylinder 37, each barrier can be automatically opened and closed. Accordingly, a lens cap unit having a high usability can be provided.

In the lens cap unit 50, even if the mounting member is contained in the containing space 75, because each barrier 52 can be closed at the object side of the mounting member (optical filter), it is possible to protect adequately the mounting member (optical filter) and the lens barrel 13.

In the lens cap unit 50, because the maximum opening state of each barrier 52 is set to be capable of receiving the lens hood 78 attached to the leading end portion of the movable lens cylinder 40, it is possible to attach the lens hood 78 to the leading end portion of the movable lens cylinder 40 in the state where the movable lens cylinder 40 is mounted on the fixed cylinder 37.

In the lens cap unit 50, because it is possible to attach the lens hood 78 to the leading end portion of the movable lens cylinder 40 in the state where the movable lens cylinder 40 is mounted on the fixed cylinder 37, it is not necessary to remove the movable lens cylinder 40 from the fixed cylinder 37 only to attach the lens hood to the movable lens cylinder 37. Consequently, processes for assembling the lens cap unit and attaching it to the camera are reduced, and there is no possibility that loses the removed lens hood.

In the lens cap unit 50, the outer edge portion 71a of the receiving portion 71 of each barrier 52 is configured to extend to the outer side in the radial direction of the shaft 56 provided on the supporting mechanism 53 of the mounting part 51, and the cut groove 71b for receiving the one end 74a of the torsion spring 74 when each barrier is rotated in the opening direction to the maximum opening state is provided in the outer edge portion 71a. Accordingly, when each barrier is closed, the outer edge portion 71a can inhibit significantly exposure of the inner portion of the supporting mechanism 53 (receiving concave portion) in cooperation with the outer edge portion 54a of the receiving concave portion 54 of the supporting mechanism 53, and it can be prevented that an unanticipated load is applied on each barrier 52, the attaching portion 66, the supporting mechanism 53, eventually the lens barrel 13. This is because, if the one end 74a of the torsion spring 74 and the outer edge portion 71a are interfered, a force for rotating each barrier 52 in the opening direction acts on the attaching portion 66 or the supporting mechanism 53, and an unanticipated load is applied on the fixed cylinder 37 (exterior 32) of the lens barrel 13 mounted on the mounting part 51 provided with the supporting mechanism 53.

In the lens cap unit 50, because the cut groove 71b provided in the outer edge portion 71a is configured to receive the one end 74a of the torsion spring 74, the interference of the one end 74a and the outer edge portion 71a is prevented. With this structure, it is possible to press each barrier 52 about the shaft 56 into the closing direction by the torsion spring 74 and rotate each barrier 52 in the opening direction to the maximum opening state.

Accordingly, in the lens cap unit 50, even if the lens barrel 13 has a structure in which the extended amount of the movable lens cylinder 40 from the fixed cylinder 37 is set to a small value, it is possible to place the barrier 52 in the completely opened state (adequate opening state).

In the lens cap unit 50 described in the embodiment, as mentioned above, it is possible to mount the lens cap unit on the fixed cylinder easily, perform the opening and closing operations of each barrier smoothly. In addition, even if the extended amount of the movable lens cylinder from the fixed cylinder is a small value, it is possible to place the barrier in the completely opened state.

As described above, in summary, the lens cap unit in the foregoing embodiment is mounted on the lens barrel including a fixed cylinder and a movable lens cylinder which is provided in the fixed cylinder and is extendable from and collapsible in the fixed cylinder in the direction of optical axis. The lens cap unit includes the mounting part mounted on the fixed cylinder, the barrier provided on the mounting part to be movable between the closed position covering the leading end portion of the movable lens cylinder and the opened position opening the leading end portion of the movable lens cylinder, and the cam protrusion provided on the barrier. The barrier is supported on the mounting part to be rotatable about the opening and closing axis perpendicular to the optical axis. The cam protrusion is configured to extend from the surface of the barrier facing the movable lens cylinder and face the leading end portion of the movable lens cylinder, and to be disposed outside an effective diameter of the movable lens cylinder, in a state where the barrier covers a leading end portion of the movable lens cylinder.

Meanwhile, the present invention is not limited to the foregoing embodiment, various modifications and changes can be made to the embodiment. These modifications and changes are as follows.

In the foregoing embodiment, the aperture of the mounting part 51 is closed by the four barriers 52 (first to fourth barriers 521, 522, 523, and 524). However, the barriers are not limited to this number and the number of the barriers may be optionally set.

In the foregoing embodiment, as one example, the lens cap unit 50 has been applied to the lens barrel of the digital camera. However, if a lens barrel includes a fixed cylinder and a movable lens cylinder extendable from the fixed cylinder and collapsible in the fixed cylinder, the lens cap unit 50 may be applied to such a lens barrel.

In the foregoing embodiment, when each cam protrusion 68 moves (contacting with the outer circumferential surface 41d) over the circumferential edge portion of the leading end surface 41c of the leading end surface 41c of the linearly-moving cylinder 41 of the movable lens cylinder 40 extended from the fixed cylinder 37 to the wide angle position, each barrier is placed in the adequate opening state. However, even if the movable lens cylinder 40 has the shortest extended amount from the fixed cylinder, each barrier, the cam protrusion may be configured to be in contact with the leading end surface 41c or the outer circumferential surface 41d of the linearly-moving cylinder 41 to place each barrier in at least an opened state more than the adequate opening state.

In the embodiment, the protruded amount of each of the cam protrusions of the barriers is set to be different each other, thereby the barriers are moved with a different timing, depending on the movement of the movable lens cylinder. However, to move the barriers with a different timing, the protruded amount of each of the cam protrusions is constant, and instead any cam surface may be provided on the leading end surface 41c or the outer circumferential surface 41d of the linearly-moving cylinder 41. Consequently, to perform such an operation of the barriers, the barrier driving device is referred to as a device that includes the cam protrusion.

In the foregoing embodiment, although the stepped portion has been provided on the barrier between the adjacent barriers, the stepped portion is not necessarily required.

In the foregoing embodiment, the cap side-connecting portion 51a of the lens cap unit 50 and the connection portion 38b of the lens barrel side-connecting portion 38 constitute the bayonet type mounting mechanism. However, because it is sufficient to mount the movable lens cylinder 40 on the fixed cylinder 37, the bayonet type mounting mechanism is not required to mount the lens cap unit on the fixed cylinder.

In the foregoing embodiment, the containing space 75 capable of containing the mounting member (optical filter 77 in the embodiment) is provided between the leading end surface of the lens barrel and the back surface of the barrier. However, this space is not necessarily requited.

In the foregoing embodiment, as the pressing member, although the torsion spring is used, the pressing member is not limited to the torsion spring.

Meanwhile, although the preferred embodiment of the present invention has been described, it should be understood that the present invention is not limited to the embodiment, various modifications and changes can be made to the embodiment by those skilled in the art as long as such modifications and changes are within the scope of the present invention as defined by the Claims.

What is claimed is:

1. A lens cap unit which is mounted on a lens barrel including a fixed cylinder and a movable lens cylinder which is provided in the fixed cylinder and is extendable from and collapsible in the fixed cylinder in a direction of optical axis, the lens cap unit comprising:
   a mounting part mounted on the fixed cylinder;
   at least one barrier provided on the mounting part to be movable between a closed position covering a leading end portion of the movable lens cylinder and an opened position opening the leading end portion of the movable lens cylinder; and
   a cam protrusion provided on the barrier,
   the barrier being supported on the mounting part to be rotatable about an opening and closing axis perpendicular to the optical axis,
   the cam protrusion being configured to extend from a surface of the barrier facing the movable lens cylinder and face the leading end portion of the movable lens cylinder, and to be disposed outside an effective diameter of the movable lens cylinder, in a state where the barrier covers a leading end portion of the movable lens cylinder.

2. The lens cap unit according to claim 1, wherein
the surface of the barrier includes a planar portion that covers the leading end portion of the movable lens cylinder, in the state where the barrier covers the leading end portion of the movable lens cylinder, and a rib protrusion portion configured to protrude from the planar surface toward the leading end portion of the movable lens cylinder and extend in a direction of the opening and closing axis.

3. The lens cap unit according to claim 1, wherein
the cam protrusion is configured to rotate the barrier into an adequate opening state where the barrier is positioned outside an angular field of the lens barrel, when the cam protrusion is in contact with an outer circumferential surface of the movable lens cylinder.

4. The lens cap unit according to claim 1, wherein
the mounting part is configured to form a containing space between the leading end portion of the movable lens cylinder contained in the fixed cylinder and the surface of the barrier.

5. The lens cap unit according to claim 1, wherein
a plurality of barriers are provided on the mounting part to be capable of opening and closing an aperture of the mounting part, each barrier including a side that extends along the mounting part and having a shape that divides an aperture of the mounting part,
each of the barriers includes a compartment wall portion provided on each of at adjacent positions of the barriers,
at least one of the barriers includes a stepped portion provided to extend from one of the compartment wall portions to another compartment wall portion, and
the stepped portion of one barrier is configured to overlap the adjacent compartment wall portion of another barrier in a direction of the optical axis, in a state where the barrier closes an aperture of the mounting part.

6. The lens cap unit according to claim 5, wherein
the cam protrusions of the barriers have different protruded amounts.

7. The lens cap unit according to claim 6, wherein
the cam protrusion of the barrier provided with the stepped portion has the longest protruded amount, and
the protruded amount of the cam protrusion of each barrier is gradually decreased, depending on reduction of a number of the stepped portions between the barriers.

8. The lens cap unit according to claim 1,
further comprising a pressing member that applies a pressing force to the barrier to bias the barrier in a direction closing an aperture of the mounting part.

9. The lens cap unit according to claim 8, wherein
the pressing member is a torsion spring configured to surround the opening and closing axis and having one end fixed to the mounting part and another end fixed to the barrier, and
the barrier includes a cut groove in which the another end of the torsion spring is received, when the barrier is rotated further in an opening direction over an adequate opening state.

10. A camera including a fixed cylinder, a movable lens cylinder which is extendable and collapsible in the fixed cylinder along an optical axis, and a lens cap unit,
the lens cap unit comprising:
   at least one barrier provided to be movable between a closed position covering a leading end portion of the movable lens cylinder and an opened position opening the leading end portion of the movable lens cylinder; and
   a cam protrusion provided on the barrier, the barrier being rotatable about an axis perpendicular to the optical axis,
   the cam protrusion being configured to extend from a surface of the barrier facing the movable lens cylinder and face the leading end portion of the movable lens cylinder, and to be disposed outside an effective diameter of the movable lens cylinder, in a state where the barrier covers a leading end portion of the movable lens cylinder.

11. The camera according to claim 10, further comprising a lens barrel including the fixed cylinder and the movable lens cylinder, and the lens cap unit includes a mounting part mounted on the fixed cylinder, and wherein the lens cap unit is mounted on the lens barrel.

12. The camera according to claim 11, wherein the lens cap unit includes a rib protrusion portion, and the surface of the barrier includes a planar portion that covers the leading end portion of the movable lens cylinder, in the state where the barrier covers the leading end portion of the movable lens cylinder, and the rib protrusion portion is configured to protrude from the planar surface toward the leading end portion of the movable lens cylinder and extend in a direction of the opening and closing axis.

13. The camera according to claim 11, wherein the cam protrusion of the lens cap unit is configured to rotate the barrier into an adequate opening state where the barrier is positioned outside an angular field of the lens barrel, when the cam protrusion is in contact with an outer circumferential surface of the movable lens cylinder.

14. The camera according to claim 11, wherein the mounting part of the lens cap unit is configured to form a containing space between the leading end portion of the movable lens cylinder contained in the fixed cylinder and the surface of the barrier.

15. The camera according to claim 11, wherein a plurality of barriers are provided on the mounting part to be capable of opening and closing an aperture of the mounting part, each barrier including a side that extends along the mounting part and having a shape that divides an aperture of the mounting part, each of the barriers includes a compartment wall portion provided on each of at adjacent positions of the barriers, at least one of the barriers includes a stepped portion provided to extend from one of the compartment wall portions to another compartment wall portion, and the stepped portion of one barrier is configured to overlap the adjacent compartment wall portion of another barrier in a direction of the optical axis, in a state where the barrier closes an aperture of the mounting part.

16. The camera according to claim 15, wherein the cam protrusions of the barriers have different protruded amounts.

17. The camera according to claim 16, wherein the cam protrusion of the barrier provided with the stepped portion has the longest protruded amount, and the protruded amount of the cam protrusion of each barrier is gradually decreased, depending on reduction of a number of the stepped portions between the barriers.

18. The camera according to claim 11, wherein the lens cap unit includes a pressing member that applies a pressing force to the barrier to bias the barrier in a direction closing an aperture of the mounting part.

19. The camera according to claim 18, wherein the pressing member is a torsion spring configured to surround the opening and closing axis and having one end fixed to the mounting part and another end fixed to the barrier, and the barrier includes a cut groove in which the another end of the torsion spring is received, when the barrier is rotated further in an opening direction over an adequate opening state.

* * * * *